United States Patent
Olarig et al.

(10) Patent No.: US 6,370,656 B1
(45) Date of Patent: Apr. 9, 2002

(54) COMPUTER SYSTEM WITH ADAPTIVE HEARTBEAT

(75) Inventors: Sompong P. Olarig, Cypress; John E. Jenne, Houston, both of TX (US)

(73) Assignee: Compaq Information Technologies, Group L. P., Houston, TX (US)

( * ) Notice: Subject to any disclaimer, the term of this patent is extended or adjusted under 35 U.S.C. 154(b) by 0 days.

(21) Appl. No.: 09/195,922

(22) Filed: Nov. 19, 1998

(51) Int. Cl.[7] ............................................... G06F 11/00
(52) U.S. Cl. ........................................ 714/23; 709/201
(58) Field of Search ............................... 714/23, 25, 2, 714/4, 6, 7, 8, 11, 31, 32, 37, 39, 40, 43, 47; 709/201, 202, 203; 710/20, 21

(56) References Cited

U.S. PATENT DOCUMENTS

| | | | | |
|---|---|---|---|---|
| 4,710,926 A | * | 12/1987 | Brown et al. ................... | 714/4 |
| 4,860,006 A | * | 8/1989 | Barall ........................ | 370/447 |
| 5,144,950 A | * | 9/1992 | Stoop et al. .................... | 607/9 |
| 5,390,324 A | | 2/1995 | Burckhartt et al. ......... | 395/575 |
| 5,390,326 A | * | 2/1995 | Shah .......................... | 370/222 |
| 5,560,033 A | * | 9/1996 | Doherty et al. ............. | 713/340 |
| 5,596,711 A | | 1/1997 | Burckhartt et al. .... | 395/182.21 |
| 5,675,723 A | | 10/1997 | Ekrot et al. ............ | 395/182.02 |
| 5,696,895 A | | 12/1997 | Hemphill et al. ...... | 395/182.02 |
| 5,781,703 A | * | 7/1998 | Desai et al. .................. | 706/50 |
| 5,892,915 A | * | 4/1999 | Duso et al. ................ | 709/219 |
| 5,987,621 A | * | 11/1999 | Duso et al. .................... | 714/4 |
| 6,006,206 A | * | 12/1999 | Smith et al. .................. | 705/35 |
| 6,202,115 B1 | * | 3/2001 | Khosrowpour ............. | 710/129 |

\* cited by examiner

Primary Examiner—Nadeem Iqbal
(74) Attorney, Agent, or Firm—Conley, Rose & Tayon, P.C.; Michael F. Heim; Jonathan M. Harris

(57) ABSTRACT

A computer system comprises a variety of components transmitting variable-rate heartbeats to a heartbeat monitor, each heartbeat indicating that the component is functioning properly. In addition, selected components serve as proxies by transmitting heartbeats to indicate that another component is functioning properly. In the preferred embodiment, one or more central processing units (CPUs) transmit heartbeats to indicate proper CPU functioning, while a bridge logic device and a network interface card (NIC) transmit heartbeats as proxies for a memory device and an external computer system, respectively. The heartbeat monitor is capable of determining initial heart rates for each component and is further capable of adaptively varying the heart rates thereafter. If the age of the heartbeat sender is relatively young, then a relatively slow heart rate is specified. Faster heart rates are specified for older components. Thereafter, the heartbeat monitor continuously tracks the age of the component, raising the heart rate as the component ages. In response to signals from a temperature sensor as well as various warning and error signals, the heartbeat monitor dynamically adjusts each heart rate independently. The heartbeat monitor may be implemented in a variety of ways, including incorporation into a computer system, as a dedicated unit coupled to a computer network, or as a software program. Further, the heartbeat monitor can receive variable-rate heartbeats from any desired device, from individual computer components to entire networks of computer systems.

61 Claims, 9 Drawing Sheets

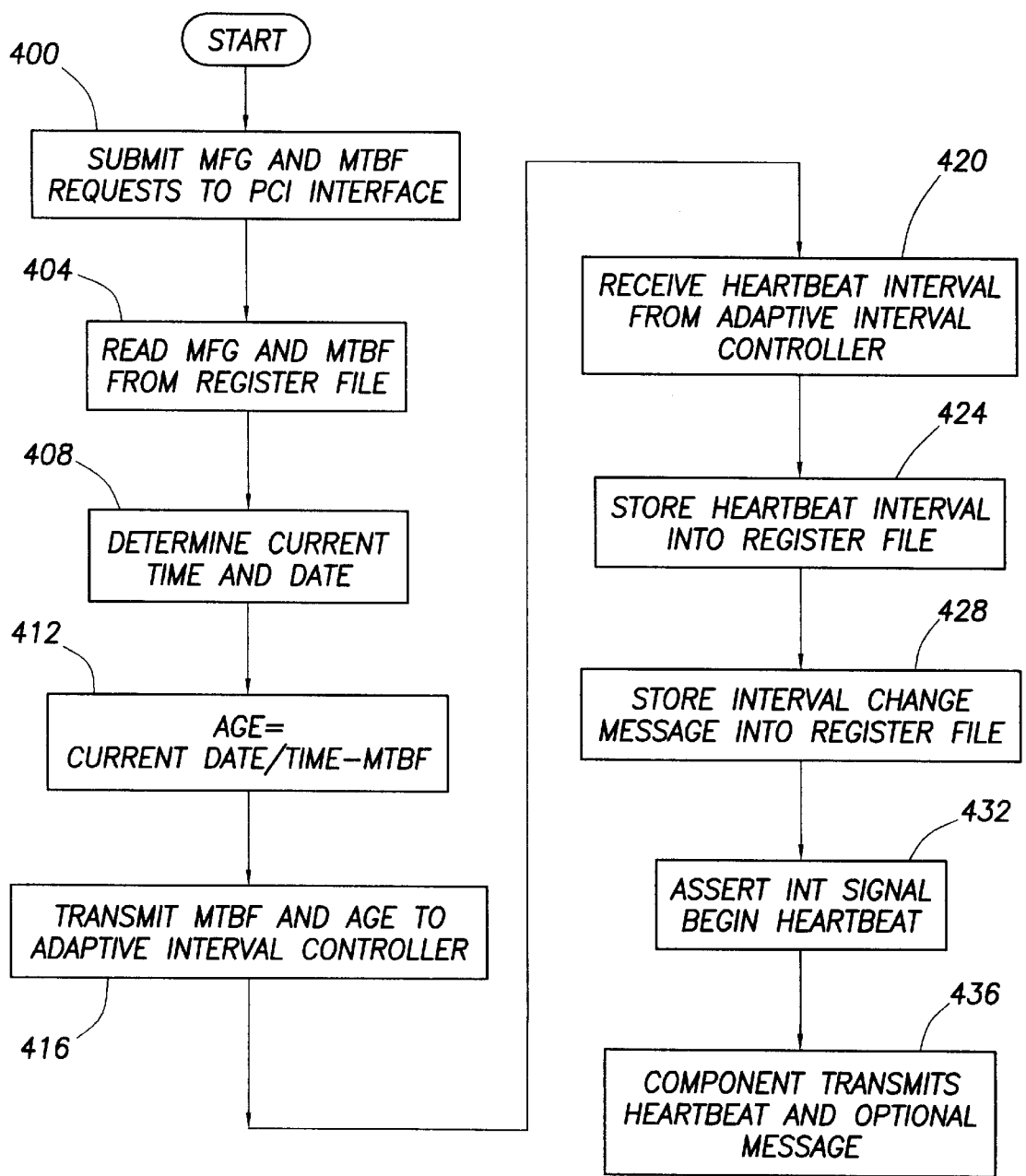

COMPUTER SYSTEM WITH ADAPTIVE HEARTBEAT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to fault tolerance in microcomputer systems, and in particular to computer systems adapted to periodically check for failures. More particularly, the present invention relates to personal computer system capable of transmitting and receiving heartbeat messages at an adjustable rate for improved fault tolerance.

2. Background of the Invention

Although early microcomputers were popular with hobbyists for such computing tasks such as word processing and video games, early microcomputer systems did not match the superior data processing speed of larger mainframes and minicomputers. Consequently, most businesses and organizations that required a high level of data processing and communications, including financial, academic, and scientific institutions, traditionally relied on networks of mainframes and minicomputers for computing tasks. In recent years, microcomputers, which may be generally defined as microprocessor-based, programmable electronic devices for retrieving, storing, and processing data, have developed rapidly in terms of processor speed, memory speed and capacity, and interconnectability. As microcomputing capabilities approach those of mainframes and minicomputers, networks of personal computer systems increasingly are utilized for the heavy data processing and communications jobs once handled by the larger machines.

Because of the sheer amount of data that must be processed by some organizations (e.g., financial and research institutions) and also the sensitivity of some data to computer system faults (such as air traffic control data and banking transactions), mainframe computers usually have incorporated measures to ensure fault tolerance, or the capability of a computer system or network of computers to continue operating even if an internal hardware or software failure occurs. Hence, fault tolerant systems are designed to operate essentially without interruptions. One method of providing fault tolerance is to combine a primary computer system with a backup system. A backup system generally waits in a standby mode without processing data until the primary system fails. When the primary system fails, the backup system replaces the primary system. The calculations of the primary system can thus be continued by the backup system, albeit with a slight interruption before the backup system is activated. Another fault tolerance scheme involves combining two "redundant" computer systems which process the same data concurrently. If one of the systems fails, then the data may still be processed by the working system. A major drawback to redundant systems is their significant expense, due to the fact that two or more data processing systems are required instead of just one. In one type of hybrid system, two or more computers operate independently, processing different data but attached to a common network. When a computer fails, the failed machine is disabled and the remaining computers on the network embrace the workload of the failed computer.

Because the cost of a typical microcomputer (or "personal computer") has remained well below the cost of a typical mainframe even as personal computing capabilities have soared, it has become increasingly cost effective to use personal computer (PC) systems for tasks that were once reserved only for mainframes. In addition, PC manufacturers have encouraged using personal computers for these tasks by introducing fault tolerance mechanisms into some recent computer designs. Fault tolerant PC networks have been introduced, as well. Personal computer networks generally include one or more personal computers configured as network servers which manage the network and the transfer and storage of data within the network. Network servers generally comprise an abundance of resources, including one or more very fast processors, a large amount of random access memory (RAM), and an abundance of disk storage space. Further, network servers typically operate at fast input/output (I/O) speeds and are given more frequent access to the network than are other computers on the network. The abundance of resources and increased network access allow each network server to transfer files and data efficiently to a large number of networked computers. Because a single failure in a network server may cause network problems or even downtime to many computer users, fault tolerant network servers generally have benefited network performance and have helped to minimize network downtime.

In one network fault tolerance scheme, two servers operate independently of each other but are capable of handling an increased workload if one of the servers fails. In such a scheme, a first server periodically transmits a "heartbeat" message over the network to a second server to indicate that the first server is functioning properly. If the second server does not receive the heartbeat message within a predetermined time interval, then the second server concludes that the first server has failed and seizes the workload of the first server. The second server also transmits a periodic heartbeat message to the first server, so that the first server may process data in place of the second server if the second server fails. Thus, each server essentially provides backup support for the other server in case of a server failure. The heartbeats typically are transmitted infrequently in order to minimize the level of network traffic.

One problem with the heartbeat scheme is that because the heartbeat messages are transmitted at fixed time intervals (or "heartbeat periods"), the heartbeat scheme may be unsuitable for networks which cannot permit downtime greater than one heartbeat period. For instance, if one server fails immediately after transmitting a heartbeat, then it will take almost one full heartbeat period before the second server detects and corrects for the failure. In some sensitive networks, such excessive downtime conceivably could severely degrade network service, cause network instability, or even result in human catastrophe if the network is involved in transportation or safety systems. Conversely, systems needing only a moderate level of fault tolerance might not require a frequent heartbeat. Because all messages sent over a network require some amount of network capacity (or "bandwidth"), a network server transmitting heartbeats at a high rate may absorb large amounts of network bandwidth. Thus, the optimum heart rate may vary according to the type of information being processed and the processing speed. Because it is difficult to design a one-size-fits-all heartbeat scheme, such methods often are not well-suited for a wide range of user applications.

While conventional heartbeat schemes are capable of monitoring whether or not a computer system has failed, these methods usually do not help to predict when failures might occur. If computer failures could be predicted before happening, then corrective actions could be taken as soon as possible to prevent or minimize system downtime. Current heartbeat schemes fail to incorporate prediction measures, however.

Thus, there remains a need for a flexible and responsive fault tolerance scheme capable of determining as well as predicting system performance. Such a scheme preferably would be able to intelligently optimize the heart rate to improve response time during a system failure. Despite the apparent advantages of such a system, to date no one has devised a computer system that offers these benefits.

SUMMARY OF THE INVENTION

Accordingly, the present invention discloses a computer system comprising two central processing units (CPUs), a bridge logic device coupled to the CPUs, and a network interface card (NIC) coupled to the bridge logic, each device transmitting variable-rate heartbeats to a heartbeat monitor. The computer system further includes a main memory device coupled to the bridge logic. In a preferred embodiment, the heartbeats transmitted by the bridge logic device indicate that the main memory is properly functioning. Similarly, the heartbeats transmitted by the NIC represent heartbeats transmitted by another computer system which is coupled to the NIC via a network such as a local area network (LAN). Each CPU transmits heartbeats to the heartbeat monitor to indicate that it is functioning properly.

The heartbeat monitor comprises a register file including an HB register for each heartbeat sender that records incoming heartbeats. In addition to receiving heartbeats, the heartbeat monitor is capable of determining initial heart rates for each component transmitting a heartbeat (or "heartbeat sender") and is farther capable of adaptively adjusting the heartbeat intervals thereafter. The register file also includes and INTERVAL register, an MFG register, an MTBF register, and an MSG register for each heartbeat sender. The INTERVAL register specifies the heartbeat interval for the associated sender. The MFG and MTBF registers store the manufacturing date and mean time between failure, respectively, of the associated sender. The MSG register is used for transmitting messages between the heartbeat monitor and the associated heartbeat sender.

The heartbeat monitor further includes a control logic coupled to the register file and a plurality of adaptive interval controllers coupled to the control logic, each interval controller associated with a different heartbeat sender. The control logic further asserts interrupt signals to the CPUs, the bridge logic, and the NIC. A temperature sensor is also included within the heartbeat monitor and provides a temperature warning signal to the interval controllers. An adaptive interval controller determines an initial heartbeat interval for the associated heartbeat sender based on the age of the sender, which can be determined from the MFG and MTBF registers. If the age of the sender is younger than the MTBF, then a longer heartbeat interval is specified. Conversely, if the age of the sender is older than the MTBF, then a shorter heartbeat interval is specified. Once an appropriate initial heartbeat interval is determined, an adaptive interval generator transmits the interval to the register file and begins transmitting a periodic PULSE signal to the monitor control logic having a period equal to the heartbeat period. The monitor control logic then notifies the heartbeat sender of the initial heartbeat interval, and the heartbeat sender commences transmitting heartbeats at the appropriate intervals.

The adaptive interval generator comprises an age counter for tracking the age of the sender, an MTBF register for holding the MTBF value, a comparator receiving the values of the age counter and MTBF register, and an interval determination logic receiving a COMPARE signal from the comparator. The adaptive interval generator further includes an error period counter and a timing interval counter, each coupled to the interval determination logic. The COMPARE signal is asserted if the value of the age counter is greater than or equal to the MTBF value, indicating that the sender is older than its MTBF. The interval determination logic thus determines a faster initial heart rate if the COMPARE signal is asserted. The age counter continuously increments, tracking the age of the sender. Thus, if the initial heartbeat interval is chosen for a sender that is younger than its MTBF, then the heart rate is increased when the value of the age counter exceeds the MTBF. The interval determination logic asserts RATE signals to the timing interval counter and to the control logic which indicate the heartbeat intervals. In response to the RATE signals, the timing interval counter measures each heartbeat interval, asserting a PULSE signal to the control logic after each successive interval. In response to each PULSE signal, the control logic checks the register file for a new heartbeat to determine whether the heartbeat sender is still functioning.

If the temperature sensor measures a temperature that exceeds a predetermined value, then the adaptive interval controllers respond by adjusting the heart rates of the associated senders. The increased heart rate (corresponding to a decreased heartbeat interval) allows the heartbeat monitor to check the heartbeat senders more frequently for failures, Along with a heartbeat message, a heartbeat sender may include warning or error messages indicating problems within the heartbeat sender. The adaptive interval generator associated with that sender responds to the warning message by temporarily decreasing the heartbeat interval to enable more frequent monitoring of the sender. Warning or error messages may cause a temporary increase in the heartbeat interval in some embodiments, however. After a predetermined error period, the heartbeat interval is then returned to normal unless the error condition persists. The error period is measured by the error period counter.

Thus, the present invention comprises a combination of features and advantages that enable it to substantially advance the art by providing an adaptive heartbeat monitor that dynamically changes the heart rates according to system demands. These and various other characteristics and advantages of the present invention will be readily apparent to those skilled in the art upon reading the following detailed description of a preferred embodiments of the invention and by referring to the accompanying drawings.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION OF THE PREFERRED EMBODIMENTS

Figure 1:
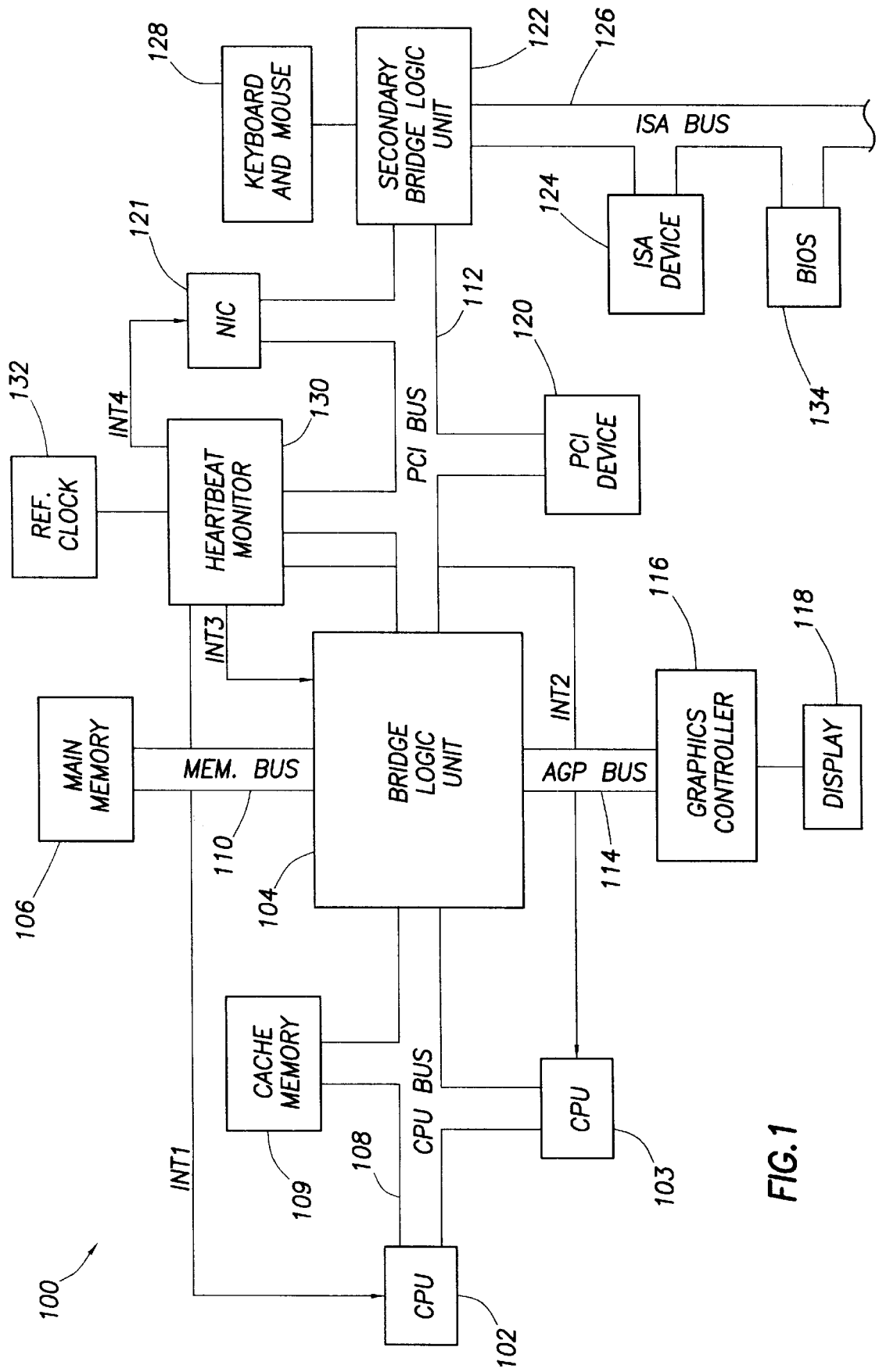
FIG. 1 is a block diagram of a computer system constructed in accordance with a preferred embodiment of the invention that includes a computer heartbeat monitor for implementing an adaptive heartbeat scheme.

Referring now to FIG. 1, a computer system 100 constructed in accordance with a preferred embodiment generally includes central processing units (or "CPUs") 102 and 103 coupled to a variety of system components through an integrated bridge logic unit 104. Computer system 100 may be configured in any number of ways, including as a laptop unit, a desktop unit, a network server, or any other configuration. The CPUs 102 and 103 couple to the bridge logic unit 104 via a CPU bus 108. An external cache memory unit 109 further may be coupled to CPU bus 108. It should be understood, however, that alternative embodiments may include only one CPU or may include any number of CPUs as desired. As shown, a main memory 106 couples to the bridge logic unit 104 through a memory bus 110, and a graphics con-troller 116 couples to the bridge logic unit 104 through any suitable graphics bus 114, such as an Advanced Graphics Port (AGP) bus. A display device 118 couples to the graphics controller 116.

Additionally, one or more expansion devices 120, 121, and 130 couple to the bridge logic unit 104 through a primary expansion bus 112. In the preferred embodiment, the primary expansion bus 112 comprises a Peripheral Component Interconnect (PCI) bus, and the expansion devices 120 thus comprise PCI devices. The PCI device 120 may include any of a variety of peripheral devices such as, for example, video accelerators, audio cards, hard or floppy disk drives, Small Computer Systems Interface (SCSI) adapters and telephony cards. It should be understood, however, that the present invention may incorporate any suitable expansion bus, network system, or communications channel and may comprise a physical or wireless architecture as desired. The PCI device 130 represents a heartbeat monitor and device 121 represents a Network Interface Card (NIC). Other expansion devices may also be included in computer system 100 and attached to the PCI bus 112. A reference clock 132 provides a synchronous clock signal to the heartbeat monitor 130. The heartbeat monitor 130 provides interrupt signals INT1, INT2, INT3, and INT4 to various other components throughout computer system 100. In a preferred embodiment, INT1 and INT2 connect to the CPU 102 CPU 103, INT3 connects to the bridge logic unit 104, and INT4 connects to the NIC 121, although it should be understood that interrupt signals may couple to any desired components within the computer system 100. Accordingly, the heartbeat monitor 130 may be constructed to provide any number of interrupt signals as desired.

A secondary bridge logic unit 122 also may be provided to accommodate an electrical interface to one or more peripheral devices 124 by way of a secondary expansion bus 126. The secondary expansion bus 126 may be implemented using any suitable bus type such as an Industry Standard Architecture (ISA) bus or an Extended Industry Standard Architecture bus (EISA). As the preferred embodiment of FIG. 1 shows, expansion bus 126 is implemented as an ISA bus and, accordingly, peripheral device 124 represents an ISA device such as a fax/modem or sound card. The expansion bus 126 preferably accommodates a BIOS ROM 134 as well.

In addition to providing an interface to an ISA or EISA bus, South bridge 122 may further incorporate other functionality, as desired. For example, in one embodiment, secondary bridge 122 includes a master PCI arbiter (not shown) for arbitrating ownership of the PCI bus 112 secondary bridge 122 may also incorporate a disk drive controller, an interrupt controller, and power management support functionality. An input/output controller (not shown), either external from or integrated with the secondary bridge 122, may also be included within computer system 100 to provide operational support for a keyboard and mouse 128 and for various serial and parallel ports, as desired.

Referring still to FIG. 1, CPUs 102 and 103 are illustrative of, for example, Pentium® Pro microprocessors. It should be understood, however, that other alternative types of microprocessors could be employed. Further, computer system 100 may include only a single CPU or include more than two CPUs coupled through the CPU bus 108 to the bridge logic unit 104.

The main memory 106 generally includes a conventional memory device or array of memory devices in which application programs and data are stored. Main memory 106 includes any suitable type of memory such as dynamic random access memory (DRAM) or any of the various types of DRAM devices such as synchronous DRAM, extended data output DRAM (EDO DRAM), or Rambus™ DRAM.

Referring still to FIG. 1, the graphics controller 116 controls the rendering of text and images on display 118. Graphics controller 116 may embody a typical graphics accelerator generally known in the art to render three-dimensional data structures on display 118. These data structures can be effectively shifted into and out of main memory 106. The graphics controller 116 therefore may assert mastership of the AGP bus 114 in that it can request and receive access to a target interface within the bridge logic unit 104 to thereby obtain access to main memory 106. A dedicated graphics bus accommodates rapid retrieval of data from main memory 106. For certain operations, graphics controller 116 may further be configured to generate PCI protocol transactions on the AGP bus 114. The AGP interface of bridge logic 104 may thus include functionality to support both AGP protocol transactions as well as PCI protocol target and initiator transactions. Display 118 is any electronic display device upon which an image or text can be represented. A suitable display 118 may include, for example, a cathode ray tube (CRT), a liquid crystal display (LCD), a virtual retinal display (VRD), a thin film transistor display (TFT), or any other type of suitable display device for a computer system.

In a preferred embodiment, various components within computer system 100 periodically send heartbeat messages to the heartbeat monitor 130 via the PCI bus 112. The heartbeat messages are stored within the heartbeat monitor 130 and indicate that the components transmitting the heartbeats (referred to as "heartbeat senders") are functioning properly. The heartbeat period, which is the length of time between each heartbeat, may be different for each heartbeat sender and can be adjusted for a given heartbeat sender depending on time or other system operating conditions as explained below. Initially, the heartbeat monitor 130 determines an appropriate heart rate for each heartbeat sender and preferably notifies a heartbeat sender when and by how much its associated heart rate needs to change. Accordingly, heartbeat senders periodically transmit heartbeats to the heartbeat monitor 130 at the intervals prescribed by the heartbeat monitor 130. Although any component within computer system 100 may transmit heartbeat messages to the heartbeat monitor, a preferably the heartbeats are transmitted by the CPUs 102 and 103, the bridge logic unit 104, and the network interface card (NIC) 121.

Before a heartbeat sender begins transmitting heartbeats, the heartbeat monitor 130 determines an initial heartbeat period for that component. The heartbeat monitor 130 then asserts an interrupt (INT) signal to the heartbeat sender to indicate that the heartbeats should begin. It should be understood that the heartbeat sender may receive any type of signal or indication to begin heartbeats, however, without departing from the principles of the present invention. Thus in the embodiment of FIG. 1, the heartbeat monitor 130 asserts the INT1, INT2, INT3, and INT4 signals to indicate that the heartbeat periods from the CPUs 102 and 103, the bridge logic device 104, and the NIC 121 have been determined. The heartbeat monitor 130 subsequently asserts INT signals to indicate a change in heart rate for a given heartbeat sender.

Figure 2:
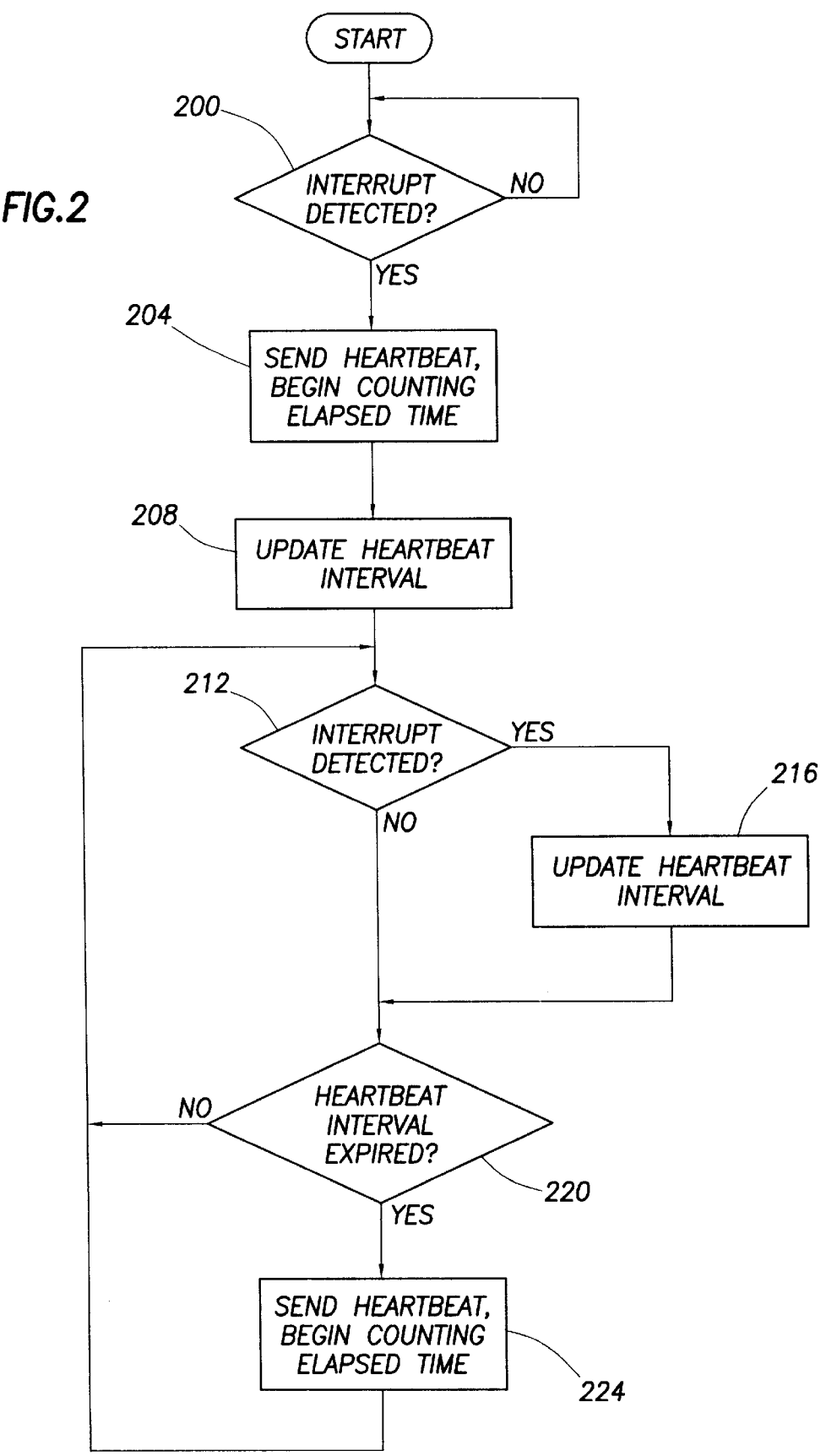
FIG. 2 is a flowchart of the steps for transmitting an adaptive heartbeat.

FIG. 2 illustrates the steps involved in transmitting heartbeats to the heartbeat monitor 130. The heartbeat sender begins with step 200, remaining in step 200 until an interrupt or other signal is detected from the heartbeat monitor 130. Upon detecting an INT signal from the heartbeat monitor 130, the heartbeat sender in step 204 transmits the first heartbeat and begins tracking the time elapsed since the first heartbeat was sent. Next, in step 208, the heartbeat sender transmits a PCI read request to the heartbeat monitor 130 in order to determine the initial heartbeat period. The heartbeat monitor 130 responds to the PCI read request (not shown) by returning the value of the heartbeat period. Because in step 204 the heartbeat sender began counting the time elapsed since the first heartbeat, the sender can transmit the next heartbeat when the elapsed time reaches the heartbeat period determined in step 208.

To indicate a change in the heartbeat interval, the heartbeat monitor 130 preferably asserts an INT signal. If no INT signal is detected in step 212, then step 220 is executed. If an INT signal is detected from the heartbeat monitor 130 in step 212, then the heartbeat sender transmits a PCI read cycle in step 216 to the heartbeat monitor 130 to determine the new heartbeat period, moving next to step 220.

In step 220 of FIG. 2, the heartbeat sender determines whether the heartbeat period has expired. If the heartbeat period has not yet expired, then the heartbeat sender repeats the previous steps, beginning with step 212. If the heartbeat period has expired, indicating that another heartbeat should be transmitted, then the component transmitting the heartbeat proceeds to step 224, transmitting a new heartbeat message to the heartbeat monitor 130. The heartbeat sender then repeats the preceding steps, beginning with step 212.

Referring again to FIG. 1, if the heartbeat monitor 130 does not receive a heartbeat signal from a heartbeat sender (i.e., CPU 102, CPU 103, bridge logic 104, NIC 121) within the proper heartbeat period, then the heartbeat monitor 130 determines that the heartbeat sender has failed and may take appropriate actions to correct for the failure. Such corrective actions preferably include sending an alarm message to CPU 102 but might also include, for example, disabling the failed heartbeat sender, enabling a backup system for the failed heartbeat sender, or arranging for a similar component to assume the workload of the failed heartbeat sender. For instance, if the heartbeat monitor 130 determines that CPU 102 has failed, the heartbeat monitor 130 can notify CPU 103 (via interrupt signal or PCI cycle) to begin handling the workload normally intended for CPU 102. It should be recognized, however, that there may be any number of corrective actions that the heartbeat monitor 130 can adopt to adjust for failed components, and the principles of the present invention should not be limited to any specific set of corrective actions.

According to another aspect of the invention is that a heartbeat message transmitted from one component may actually represent the status of another component. In other words, some components within the computer system preferably serve as "proxies" for other heartbeat senders. In a preferred embodiment, the bridge logic 104 transmits a heartbeat message to indicate that the main memory 106 is functioning properly, although a memory device 106 capable of transmitting its own heartbeat alternatively could be incorporated into the present invention. The bridge logic 104 is naturally suited to serve as a proxy for the memory 106, however, since the bridge logic 104 typically coordinates memory reads and writes and can often detect problems with memory transactions. Accordingly, the bridge logic 104 preferably transmits a heartbeat signal only if the memory device 106 is functioning properly. To indicate that the memory device 106 has failed, the bridge logic 104 stops sending heartbeats. In an alternative embodiment, the bridge logic 104 transmits multiple heartbeats representing a plurality of memory devices or different banks or portions of a memory device.

Other devices may serve as proxies as well. For instance, the NIC 121 is adapted to connect to a network such as a local area network (LAN), through which one or more computer systems can transmit heartbeat messages to computer system 100. Accordingly, heartbeat signals sent to the NIC 121 from other computers are forwarded to the heartbeat monitor 130 via the PCI bus. Thus the present invention is adapted not only to monitor the status of devices and components within computer system 100 but also other computer systems and devices outside of system 100. Likewise, computer system 100 preferably is adapted to transmit heartbeats to another computer system via the NIC 121.

In accordance with a preferred embodiment, CPU 102 transmits heartbeat messages to the NIC 121 via the PCI bus 112. The heartbeats from the CPU 102 then are forwarded to the receiving computer system over the LAN (not shown in FIG. 1). If the heartbeat monitor 130 detects that CPU 102 has failed but that CPU 103 is still operational, then CPU 103 preferably continues transmitting heartbeat messages through the NIC 121. By sending and receiving heartbeat messages with other computer systems or network servers via the LAN, computer system 100 can be incorporated into a larger, fault tolerant network system similar to systems described in U.S. Pat. No. 5,390,324 and U.S. Pat. No. 5,596,711, commonly assigned to Compaq Computer Corporation. By offering an adaptive heartbeat fault tolerance scheme, the resulting network system is more flexible and responsive to computer system failures than were previous designs.

Because longer heartbeat periods may be advantageous for some situations while shorter heartbeat periods may be better at other times, the heartbeat monitor 130 preferably is capable of dynamically optimizing the heart rate for each component. A frequent heartbeat, (characterized by a short heartbeat period) allows the system to detect and recover from failure more quickly. A frequent heartbeat generally minimizes average recovery time, because the heartbeat period represents the maximum time required for the heartbeat monitor 130 to detect that a component has failed to send a heartbeat since the last detected heartbeat. In addition to reducing average system recovery time, however, shortening the heartbeat period increases the amount of message traffic on the PCI bus 112, thereby reducing the total amount of PCI bus capacity available to other components. Hence, if the heartbeat period is shorter than necessary, then the message traffic created by the heartbeats may interfere with other important computer functions. In contrast, an infrequent heartbeat (characterized by a long heartbeat period) produces less PCI bus traffic. If the heartbeat is too infrequent, however, the heartbeat monitor 130 may not detect component failures quickly enough. Accordingly, it often is desirable to optimize the heartbeat period to be just short enough to facilitate expedient failure recovery but not short enough to bottleneck the PCI bus 112. Thus, the heartbeat of the preferred embodiment is adaptive.

Although maintaining a heartbeat at optimally short intervals helps the computer system 100 to quickly recover from or adjust for failures while not overburdening the expansion bus 112 or a local area network (e.g., when heartbeats are transmitted and/or received via the NIC 121), some conditions within computer system 100 may warrant increasing the frequency of one or more heartbeats, despite the resulting increase in data traffic. For instance, the likelihood that a given component will fail generally depends on the age of that component—older components are more likely to fail than new components. Accordingly, the heartbeat monitor 130 preferably determines or is provided with the manufacturing date of each heartbeat sender and sets the heart rate accordingly. If available, the manufacturing date of a particular heartbeat sender may be determined by transmitting the proper request to that component, as known to one of ordinary skill in the art. In an alternative embodiment, the manufacturing date of each sender is stored in the BIOS ROM 134 or configured with software by the user or system administrator.

Still referring to FIG. 1, the heartbeat period preferably is longer for newer components and shorter for older components. In addition, the heartbeat period (or equivalently the heart rate) may be adjusted at any time by the heartbeat monitor 130. In the event that the heartbeat monitor 130 is not able to determine the manufacturing date of a component, the heartbeat period preferably is set to a predetermined default value. The default value preferably is equal to the maximum acceptable delay for determining component failure, although any desired default value may be used without departing from the principles of the invention.

Similarly, the heartbeat monitor 130 may also raise or lower the heart rate of any heartbeat sender according to warning signals or environmental conditions within the computer. In a preferred embodiment, heartbeat monitor 130 includes a temperature sensor which determines when the temperature of the computer 100 rises above an acceptable threshold. Because excessive temperatures can increase the likelihood of component failures, the heartbeat monitor 130 preferably increases the heart rates of selected components so that these components can be monitored more often if the temperature exceeds a threshold. If the temperature drops below the temperature threshold, then the heart rates are lowered to the previous level.

In addition, the heartbeat monitor 130 is capable of receiving error signals or warning signals from some components to indicate possible impending failures or other dangerous conditions. The heartbeat monitor 130 then respond by increasing the heart rate for that device. In a preferred embodiment, the bridge logic 104 is capable of detecting errors in read and write cycles to main memory 106. If memory transaction errors begin to occur frequently, then the bridge logic 104 preferably notifies the heartbeat monitor 130 of the error condition by transmitting a message over the PCI bus 112. Alternatively, the bridge logic 104 may assert a special interrupt signal or other sideband signal to the heartbeat monitor 130 to indicate excessive memory errors. In response, the heartbeat monitor 130 preferably increases the heart rate of the bridge logic 104 in order to monitor the memory device 106 more often. The heartbeat monitor 130 can decrease the heart rate of the bridge logic 104 if the bridge logic 104 indicates via a PCI message or other signal that the memory errors have subsided.

The heartbeat intervals may be decreased in response to some other conditions, as well. For example, the PCI bus 112 may transmit a signal indicating that it has reached a predetermined traffic threshold. Similarly, the bridge logic 104 may transmit a message indicating a large number of pending requests for main memory 106. Because these messages indicate that some resources in the system are undergoing heavy use (i.e., the PCI bus 112 and the memory device 106), the heartbeat monitor 130 preferably responds by increasing the associated heartbeat intervals to allow these devices to operate as efficiently as possible.

Thus, the present invention is capable of optimizing the checking of each component at a rate that depends on the likelihood that the component will fail. Because older components are more likely to fail than newer ones, the older components are checked more frequently than the newer components. Also, heart rates may be raised to check certain components more often if errors, warnings, and environmental conditions (such as temperature) indicate the possibility of failure. The heart rate may be reduced as well, under some conditions. The resulting system is thereby capable of anticipating certain failures and monitoring more closely under dangerous conditions. The heartbeat monitor 130 thus is said to be "adaptive," due to the fact that the heartbeat monitor 130 can optimally determine and change the heartbeat interval at any time. The heartbeat intervals, therefore, are adaptively initialized and adaptively adjusted to appropriate values based on various parameters including age, temperature, warning conditions, or any other desired criteria.

Figure 3:
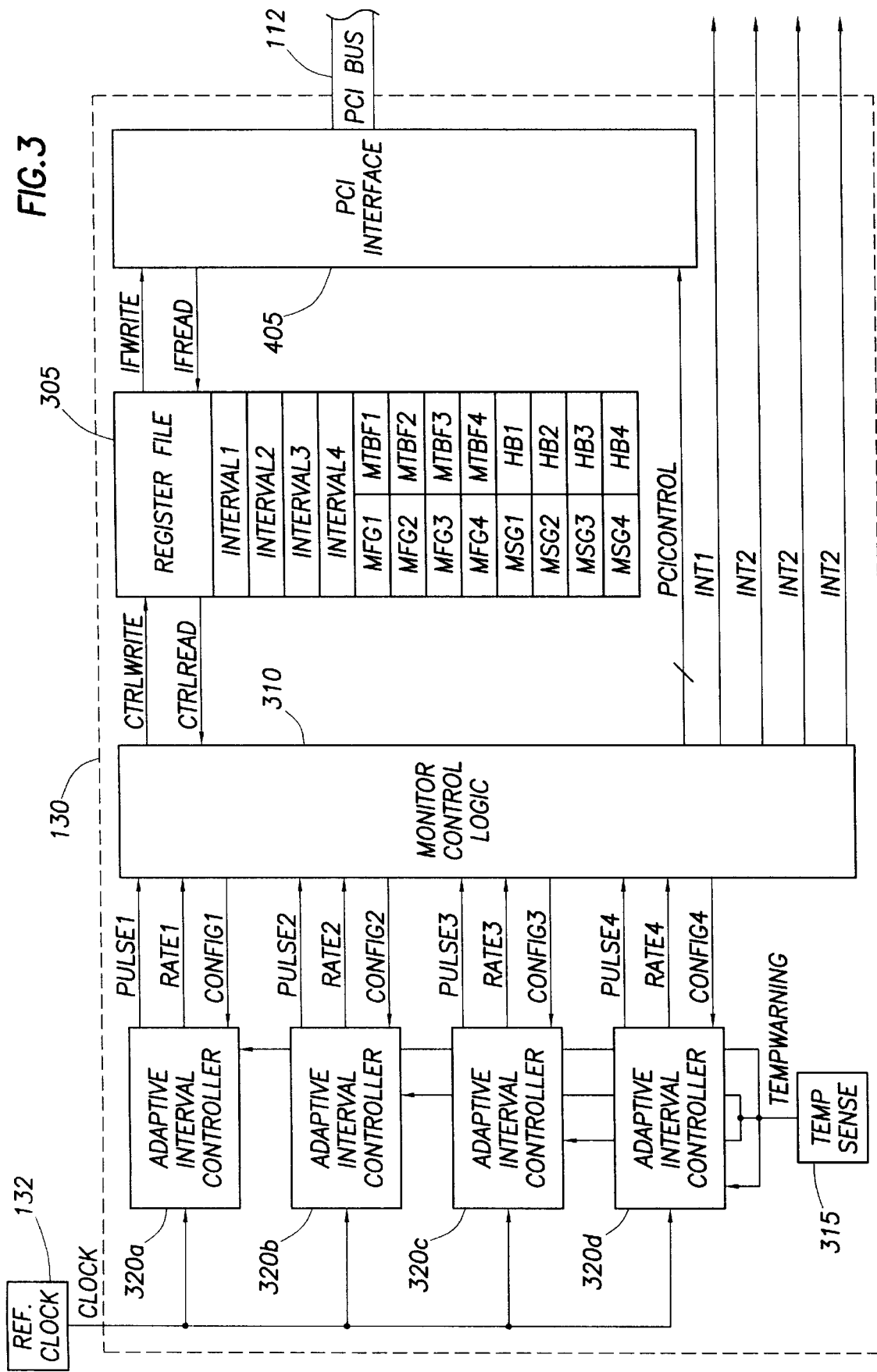
FIG. 3 is a block diagram of a preferred embodiment of the heartbeat monitor of FIG. 1 including a plurality of adaptive interval controllers.

Turning now to FIG. 3, the heartbeat monitor 130 preferably comprises a monitor control logic 310 coupled to a plurality of adaptive interval controllers 320a–d (collectively referred to simply as "interval controllers 320"), a register file 305, and a PCI interface 300. Although four adaptive interval controllers 310 are pictured in FIG. 3, the heartbeat monitor 130 preferably includes an adaptive interval controller 320 for each monitored component. Accordingly, the adaptive interval controllers of FIG. 3 are associated with CPU 102 (controller 320a), CPU 103 (controller 320b), main memory 106 (controller 320c), and an external computer system (controller 320d). In a preferred embodiment, the heartbeat monitor 130 also includes a temperature sensor 315 which provides an over-temperature signal TEMPWARNING to the adaptive interval controllers 320. Alternatively, the temperature sensor 315 may be located elsewhere in the computer 100 and connected to the heartbeat monitor 130. The adaptive interval controllers 320 further receive a CLOCK signal for synchronization from the reference clock 132. The monitor control logic 310 transmits CONFIG signals (CONFIG1–CONFIG4) to each of the adaptive interval controllers 320 and receives from each adaptive interval controller 320 a PULSE signal (PULSE1–PULSE4) and a set of RATE signals (RATE1–RATE4). The monitor control logic 310 writes data to the register file 305 via the CTRLWRITE signals and reads data from the register file 305 via the CTRLREAD signals. Similarly, the PCI interface 300 writes data to the register file 305 via IFWRITE signals and reads data from the register file 305 via IFREAD signals. The monitor control logic 310 further couples to the PCI interface 300 via PCICONTROL signals for transmitting and receiving PCI bus cycles. Accordingly, the PCI interface 300 couples to the PCI bus 112 for transacting PCI bus cycles for the heartbeat monitor 130.

The monitor control logic 310 generally controls the activities of the heartbeat monitor 130 and preferably comprises a programmable, microcontroller-based system for implementing the procedures disclosed herein. As one of ordinary skill in the art will immediately recognize, however, the monitor control logic 310 may be implemented in numerous ways, including a microprocessor, an Application Specific Integrated Circuit (ASIC), a programmable logic device (PLD), or any other type of device for implementing logical functions and algorithms. In addition, the other devices and functions within the heartbeat monitor 130 may be incorporated into the same device as the monitor control logic 310. Further, as will become apparent upon examining this disclosure and the accompanying figures, portions of the heartbeat monitor 130 including the monitor control logic 310, adaptive interval controllers 320, and any other desired components, may be combined into a single device such as a processor, a controller, an ASIC, a PLD, or any other type of logic device.

The monitor control logic 310 configures the heartbeat monitor 130 for operation as the computer system 100 first boots. Configuration generally includes determining the manufacturing date and mean time between failures (MTBF) for each heartbeat sender, calculating an initial heartbeat interval for each component, and transmitting the initial heartbeat interval to each heartbeat sender. The mean time between failures of a device represents the average amount of time, after beginning operation, that the device operates without failing. The MTBF thus will comprise a quantity of time that may be measured using any variety of units, including hours, days, or years. In a preferred embodiment, the heart rate of a component is increased due to age when that component reaches an age equivalent to its MTBF, because that device is more likely to fail at that point. As with the manufacturing date, the MTBF of a computer component usually is located within the component being monitored and can be determined during normal computer operation by transmitting the proper request to that component. Alternatively, the MTBF may be stored in BIOS ROM 134 or input by the user or system administrator for subsequent retrieval by the heartbeat monitor 130.

In a preferred embodiment, the adaptive interval controllers 320 determine the heart rates for the components being monitored. Initially, each adaptive interval controller 320 determines an appropriate heart rate based on the age relative to the MTBF of the heartbeat sender. If a heartbeat sender is older that its MTBF, then its heart rate will be faster than if the component age is younger than the MTBF. The adaptive interval controller 320 indicates the initial heart rate (or a subsequent heart rate change) by encoding a new heartbeat interval onto the RATE signals. The adaptive interval controller 320 then periodically asserts the PULSE signal to indicate that the monitor control logic 310 should check the register file 305 for a heartbeat from the heartbeat sender. Accordingly, the rate of the PULSE signal preferably equals the rate of the heartbeat messages.

The register file 305 includes a plurality of storage locations for holding the manufacturing date and MTBF of each heartbeat component. The storage locations holding the manufacturing dates are illustrated in FIG. 3 as MFG1 (manufacturing date of CPU 102), MFG2 (manufacturing date of CPU 103), MFG3 (manufacturing date of main memory 106), and MFG4 (manufacturing date of an external computer system). Likewise, the storage locations holding the MTBFs are illustrated in FIG. 3 as MTBF1 (MTBF of CPU 102), MTBF2 (MTBF of CPU 103), MTBF3 (MTBF of main memory 106), and MTBF4 (MTBF of external computer system).

In a preferred embodiment, register file 305 further includes INTERVAL registers for storing the heartbeat periods and message (MSG) registers for exchanging status messages and other information with the monitored components. Thus, FIG. 3 illustrates the INTERVAL1 register (for CPU 102), the INTERVAL2 register (for CPU 103), the INTERVAL3 register (for bridge logic 104), and the INTERVAL4 register (for NIC 121). The MSG registers include the MSG1 register (for CPU 102), the MSG2 register (for CPU 103), the MSG3 register (for main memory 106), and the MSG4 register (for the external computer system). Also, the register file 305 preferably includes a heartbeat (HB) register for the heartbeat messages. Each heartbeat register is marked (or "set") whenever a heartbeat is received. The heartbeat registers are shown as part of the register file 305 in FIG. 3 and labeled HB1 (for CPU 102), HB2 (for CPU 103), HB3 (for the main memory 106), and HB4 (for the external computer system). As will be described in greater detail below, the monitor control logic 130 preferably clears each HB register periodically to allow a subsequent heartbeat to set the HB register.

The PCI interface 300 is configured to receive heartbeat messages as well as other PCI read and write transactions from the PCI bus 112. Because generally any type of bus, communications channel, or network system may be used in place of the PCI bus 112, the PCI interface 300 preferably comprises a suitable interface for the particular architecture used. The heartbeat messages preferably contain an identifier (ID) field and a message field. The ID field uniquely identifies which component is sending the heartbeat, and the message field preferably contains error and warning information pertaining to the heartbeat sender. The error/warning information may include any desired information about the component that may affect the heart rate. As an example, the bridge logic device 104 preferably transmits a memory error message during the heartbeat if a sufficient number of memory transaction errors are detected during read and write transactions with main memory 106. The message field, which may be left blank or may be omitted if no errors or warnings exist, is used by the adaptive interval controller 320 to adjust the heart rate. The message alternatively may contain a positive indication that the component is operating correctly. Upon receiving the heartbeat message, the PCI interface 300 stores the heartbeat into appropriate MSG register in the register file 305, based on the value of the ID field. The heartbeat message field is written into the MSG register associated with the heartbeat sender.

Referring still to FIG. 3, the temperature sensor 315 preferably is included as part of the heartbeat monitor in order to allow the adaptive interval controllers 320 to adjust heart rates according temperature. The temperature sensor 315 preferably incorporates hysteresis for noise suppression, as is known to one of ordinary skill in the art. Because excessive temperatures may indicate impending component failures, the temperature sensor 315 asserts a TEMPWARNING signal to the adaptive interval controllers 320 to indicate if the computer temperature exceeds a predetermined threshold. If the TEMPWARNING signal is asserted, the adaptive interval controllers 320 adjust the heart rates as described below. Because the temperature measured by the temperature sensor 315 may not always be indicative of the temperature outside computer system 100, an external computer system transmitting heartbeats to computer system 100 via the NIC 121 preferably includes an over-temperature warning in the message field of a heartbeat to indicate excessive temperature.

It should be understood that there may be numerous alternatives to the temperature sensor 315. First, the temperature sensor 315 may be incorporated into another component in the computer system 100. Accordingly, a TEMPWARNING signal may be transmitted to the heartbeat monitor 130 by way of an interrupt signal, a message via PCI cycle, or by any other sideband signal. Also, the heartbeat senders (or their proxies) may incorporate the temperature sensing independently. The TEMPWARNING signal may then be communicated to the heartbeat monitor by way of any direct signal (such as an interrupt or a sideband signal) or may be transmitted as a message to the heartbeat monitor 130 via the PCI bus. In one alternative embodiment, the heartbeat sender includes an over-temperature warning message in the message field of the heartbeat. In another alternative embodiment, a signal or message indicating the temperature condition may be received from a temperature sensor external to the computer system 100. In yet another embodiment of the invention, the temperature sensor may provide an under-temperature warning signal, to indicate that the computer system temperature has fallen below a predetermined threshold. Hence, the TEMPWARNING signal need not indicate only that the temperature is over a certain temperature threshold but may serve to indicate any desired temperature condition.

Figure 4B:
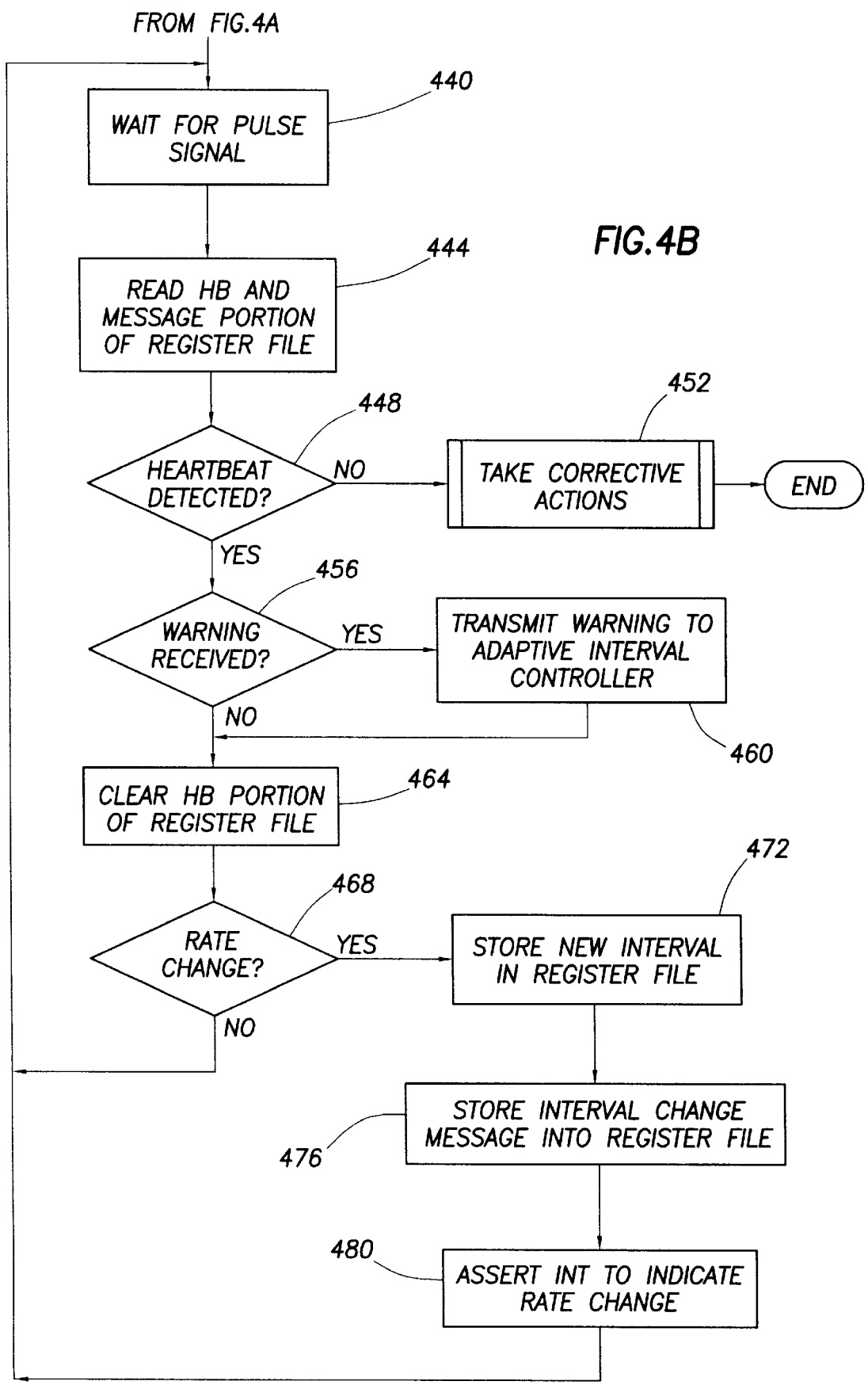
FIG. 4 is a flowchart illustrating the steps for receiving heartbeat messages.

FIG. 4 identifies the preferred steps taken by the monitor control logic 310 for monitoring one heartbeat sender and should be read in conjunction with FIG. 3. The steps for monitoring a plurality of components are substantially the same as in FIG. 4. It should be understood that the steps of FIG. 4 apply to monitoring any desired heartbeat sender. Beginning in step 400 of FIG. 4, the monitor control logic 310 determines the manufacturing date and MTBF for the monitored component, preferably by transmitting a PCI read request to the PCI interface 300 via the PCICONTROL lines. In response, the PCI interface 300 obtains mastership of the PCI bus 112 to complete the request the requests over the PCI bus 112. In step 404, the PCI interface 300 receives the reply transactions containing the manufacturing date and MTBFs and stores the resulting values into the register file 305 via the IFWRITE signals. The PCI interface 300 then notifies the monitor control logic 310 via the PCICONTROL signals that the manufacturing dates and MTBFs have been stored into the register file 305.

In step 408 the monitor control logic 310 reads the manufacturing dates and MTBFs from the register file 305. Then, in step 412, the monitor control logic 310 determines the current date and time, using any of a variety of known techniques. Proceeding to step 412, the monitor control logic 310 next determines the age of the heartbeat sender. The component age can be calculated by subtracting the manufacturing date of the component from the current date/time.

The monitor control logic next executes step 416, in which the MTBF and component age are transmitted to the proper adaptive interval controller 320. Accordingly, the MTBF and age of CPU 102 are transmitted to adaptive interval controller 320a, while the MTBF and age of CPU 103 are transmitted to adaptive interval controller 320b. Further, the MTBF and age of the main memory 106 are transmitted to adaptive interval controller 320c, and the MTBF and age of the external computer system are transmitted to adaptive interval controller 320d.

Each adaptive interval controller 320 next transmits an initial heartbeat period to the monitor control logic 310 via the associated RATE signal in step 420. Thus, adaptive interval controller 320a transmits the initial heartbeat period for CPU 102 via the RATE1 signal, adaptive interval controller 320b transmits the initial heartbeat period for CPU 103 via the RATE2 signal, adaptive interval controller 320c transmits the initial heartbeat period for main memory 106 via the RATE3 signal, and adaptive interval controller 320d transmits the initial heartbeat period for the external computer system via the RATE4 signal.

Next moving to step 424, the monitor control logic 310 stores each initial heartbeat period into register file 305. Thus, the heartbeat period for CPU 102 is stored into the INTERVAL1 register, the heartbeat period for CPU 103 is stored into the INTERVAL2 register, the heartbeat period for main memory 106 is stored into the INTERVAL3 register, and the heartbeat period for the external computer system is stored into the INTERVAL4 register.

To notify the heartbeat senders that the initial interval has been placed in the register file 305, the monitor control logic 310 in step 428 stores an "Interval Change" message into each MSG location of the register file 305. Then moving to step 432, the monitor control logic 410 asserts the interrupt signals INT1, INT2, INT3, and INT4 to indicate that the heartbeats can begin. In response, the CPU 102, CPU 103, bridge logic 104, and external computer (via the NIC 121) each transmit a heartbeat message via the PCI bus 112.

Although not specifically shown in FIG. 4, the heartbeat senders next submit PCI read cycles to the heartbeat monitor 130 in order to read the associated INTERVAL and MSG registers in the register file 305, as described in FIG. 3 above. Subsequent heartbeats are then generated at the time intervals prescribed in the INTERVAL registers. Thus, the CPU 102 transmits heartbeats at the time interval prescribed by the value of the INTERVAL1 register, the CPU 103 transmits heartbeats at the time interval prescribed by the value of the INTERVAL2 register, the bridge logic 104 transmits heartbeats representative of the main memory 106 at the time interval prescribed by the value of the INTERVAL3 register, and the NIC 121 transmits heartbeats from the external computer system at the time interval prescribed by the value of the INTERVAL4 register.

The PCI interface 300 receives the heartbeat messages from the PCI bus 112 in step 436, and waits for a PULSE signal in step 440. From step 440, the monitor control logic 310 proceeds to step 444 upon receiving the PULSE signal. In step 444, the HB and MSG values for the heartbeat sender are read from the register file 305. If the heartbeat sender successfully transmitted a heartbeat in step 436, then the associated HB register will be set (or "asserted") in step 444. If the heartbeat sender did not transmit a heartbeat during step 436, however, then the HB register will not be set.

Thus, step 448 branches according to whether or not the HB register is set for the heartbeat sender. If the HB register is not set, indicating that a heartbeat was not transmitted from the heartbeat sender, then the component transmitting the heartbeat is considered to have failed. As a result, program flow moves to step 452, in which actions are taken to correct or adjust for the failure. Corrective actions preferably include transmitting an alarm message or interrupt to CPU 102 or CPU 103 to indicate a component failure. The CPU can then adjust for the failure by any number of methods, including disabling the failed component or arranging for a component replacement internally. It should be understood, however, that any desired corrective actions may be taken without departing from the principles of this disclosure.

If the HB register is set in step 448, indicating that a heartbeat was transmitted in step 436, then the program moves to step 456. In step 456, the program branches according to whether or not the MSG register contains an error or warning message pertaining to the heartbeat sender. If the contents of the MSG register contain no warning or error messages, then step 456 leads to step 464, described below. If the MSG register contains a warning or error message, then the MSG contents are transmitted to the associated adaptive interval controller 320 in step 460 via the CONFIG signals. Step 460 leads to step 464, described below. The adaptive interval controller 320 preferably is capable of changing the heart rate according to the contents of the MSG register. A more detailed description of the operation of the adaptive interval controller 320 is included below with respect to FIGS. 5 and 6.

Figure 5:
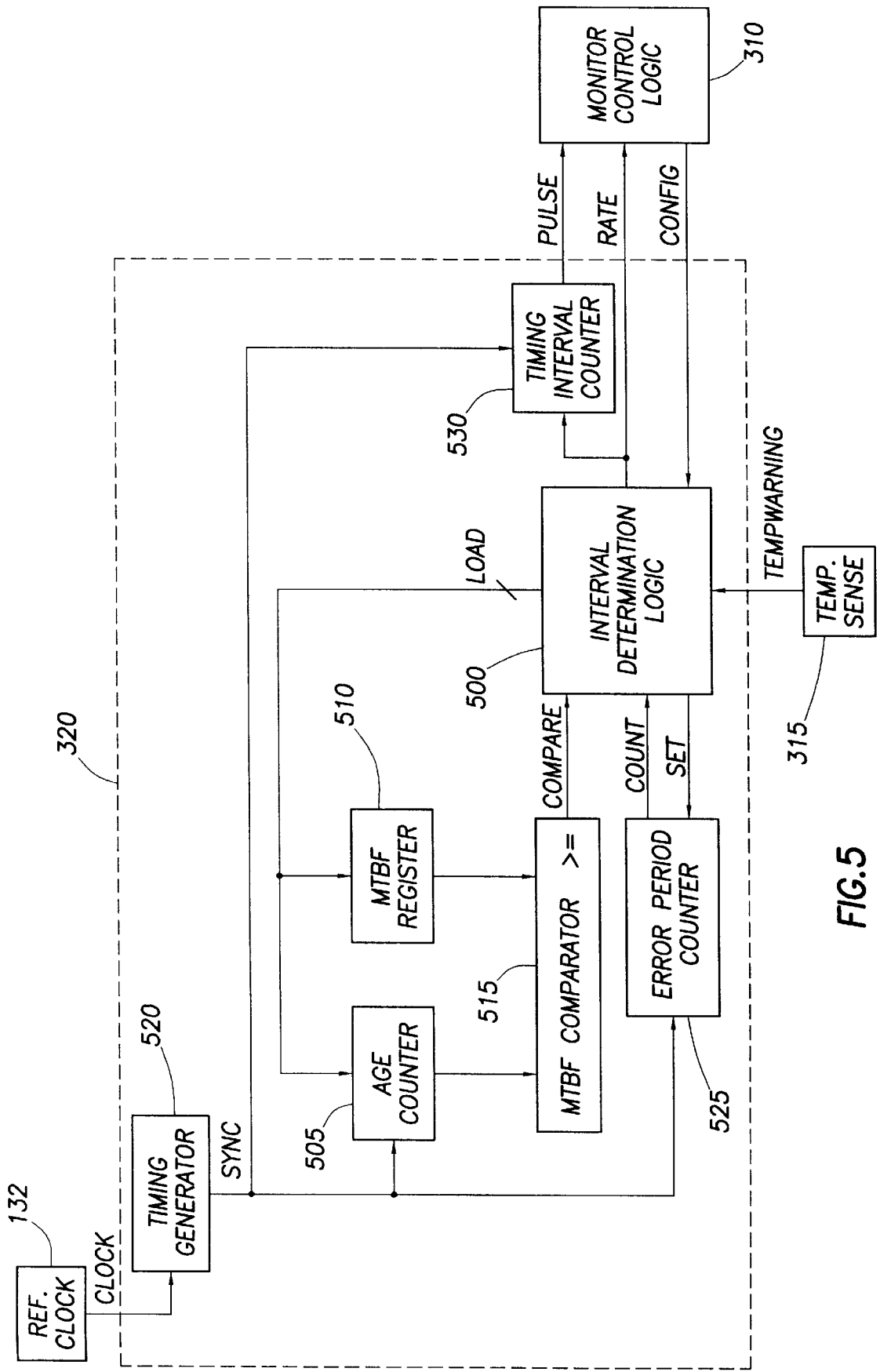
FIG. 5 is a block diagram of a preferred embodiment of the adaptive interval controller of FIG. 3 including interval determination logic for determining the heartbeat period.

Still referring to FIGS. 4 and 5, the monitor control logic 310 indicates, in step 464, that the heartbeat was detected by clearing (or "deasserting") the HB register. Next moving to step 468, the monitor control logic 310 determines if the adaptive interval controller 320 has indicated that the heart rate should change. If the adaptive interval controller 320 does not indicate a rate change in step 468, then the program returns to step 440 to await the next heartbeat message. If the adaptive interval controller 320 indicates a rate change, however, then the monitor control logic 310 moves to step 472.

In step 472, the monitor control logic 310 stores the new heartbeat period (as encoded by the RATE signals) into the associated INTERVAL register in the register file 305. Next in step 476, the monitor control logic 310 stores an "Interval Change" message into the associated MSG register in the register file 305. In step 480, the monitor control logic 310 asserts the INT signal to the heartbeat sender, indicating that the heartbeat sender should read the register file contents. Accordingly, the heartbeat sender (or its proxy) transmits a PCI read request to the heartbeat monitor 130 in order to read the MSG and INTERVAL registers in the register file 305. Following step 480, the program returns to step 440 to await the next heartbeat message. After the next heartbeat message is transmitted to the heartbeat monitor 130, the heart rate changes according to the new heartbeat period.

Now referring to FIG. 5, the preferred embodiment of adaptive interval controller 320 comprises an interval determination logic device 500 coupled to an age counter 505, an MTBF register 510, an MTBF comparator 515, an error period counter 525, and a timing interval counter 530. The adaptive interval controller 320 further includes a timing generator 520 receiving a CLOCK signal from the reference clock 132 and providing a SYNC signal to the age counter 505, the error period counter 525, and the timing interval counter 530. The interval determination logic 500 asserts LOAD signals program the age counter 505 and MTBF register 510. The values held by the age counter 505 and the MTBF register 510 are fed into to the MTBF comparator 515, which preferably asserts the COMPARE signal to the interval determination logic if the value in the age counter 505 is equal to or greater than the value in the MTBF register 510. The interval determination logic 500 programs the error period counter 525 via SET signals and determines the value of the error period counter 525 via COUNT signals. The interval control logic 500 asserts RATE signals to the timing interval counter 530 and to the monitor control logic 310 indicating the value of the current heartbeat period. The timing interval counter 530 preferably comprises a synchronous counter which periodically asserts a PULSE signal to the monitor control logic 310 to indicate the heartbeat intervals. The interval determination logic 500 further receives CONFIG signals from the monitor control logic 310 and the TEMPWARNING signal from the temperature sensor 315.

The interval determination logic 500 generally controls the activities of the adaptive interval controller 320 and preferably comprises a programmable, microcontroller-based system for implementing the procedures disclosed herein. As one of ordinary skill in the art will immediately recognize, however, the interval determination logic 500 may be implemented in numerous ways, including a microprocessor, an Application Specific Integrated Circuit (ASIC), a programmable logic device (PLD), or any other type of device for implementing logical control functions. Further, the entire adaptive interval controller 320 may be incorporated into such a device.

The interval determination logic 500 receives information from the monitor control logic 310 regarding the heartbeat sender and about the computer system 100, determining an appropriate heartbeat period based on that information. The information may include, for example, the age and MTBF of the component, the temperature of the computer system 100, and whether or not the heartbeat sender is experiencing operating errors that may indicate impending failure. After determining an appropriate heartbeat period, the interval determination logic 500 encodes the heartbeat period onto the RATE lines, which couple to the timing interval counter 530 and the monitor control logic 310.

The timing generator 520 preferably comprises a synchronous frequency divider that receives the CLOCK signal from the reference clock 132 and produces the SYNC signal at a frequency less than or equal to that of the CLOCK signal. The SYNC signal thus provides a timing signal for the synchronous devices within the adaptive interval controller 320 (e.g., the age counter 505, error period counter 525, and timing interval counter 530). In an alternative embodiment, the timing generator 520 provides a plurality of SYNC output signals to the synchronous devices, so that the age counter 505, error period counter 525, timing interval counter 530, and any other synchronous devices within the adaptive interval controller 320 may operate at different rates.

The age counter 505 preferably comprises a synchronous counter which regularly updates the age of the heartbeat sender. First, the interval determination logic 500 transmits the age of the heartbeat sender to the age counter 505 via the LOAD signals. The age counter 505 then increments the age value once for each cycle of the SYNC signal. Accordingly, the time resolution of the age counter 505 should correspond to the cycle period of the timing generator 520. The age counter 505 thus provides the MTBF comparator 515 with a current component age.

The timing interval counter 530 asserts the PULSE signal to mark the end of each heartbeat period (or heartbeat interval). After the timing interval counter 530 receives the heartbeat period via the RATE signals, the timing interval counter begins counting down, beginning from the heartbeat interval value. The timing interval counter 530 receives a SYNC signal from the timing generator 520, which is used to synchronize the counter. When the value of the timing interval counter 530 reaches zero, the timing interval counter 530 asserts the PULSE signal briefly preferably for one clock period of the SYNC signal), and the value of the timing interval counter is reset to the heartbeat interval. The timing interval counter 530 continues counting down repeatedly from the heartbeat interval to zero, asserting the PULSE signal at zero to indicate that another heartbeat interval has expired.

The MTBF register 510 holds the age at which the component reaches its MTBF, so that the MTBF comparator 515 asserts the COMPARE signal when the value of the age counter 505 is greater than or equal to the MTBF value. Thus when COMPARE is asserted, the interval determination logic 500 increases the heart rate of the heartbeat sender by decreasing the heartbeat period.

Still referring to FIG. 5, the error period counter 525 preferably comprises a synchronous counter and receives the SYNC signal for timing. When the interval determination logic 500 receives an indication of an error or warning condition within the computer system 100, such as an over-temperature warning or a memory error warning, the interval determination logic 500 preferably raises the heart rate for a period of time (known as the "error period") in order to more closely monitor the heartbeat sender. If the heartbeat sender fails during the error period, then the increased heart rate will allow the heartbeat monitor 130 to detect the failure more quickly, decreasing the time required for computer system 100 to take corrective actions. Accordingly, if the interval determination logic 500 receives a warning or error message from the monitor control logic 310 or if the temperature sensor 315 asserts the TEMPWARNING signal, the interval determination logic 500 programs the error period counter 525 to count for one error period. The error period counter 525 preferably is programmed with an appropriate error period value via the SET signals. After counting for one error period, the error period counter 525 asserts the COUNT signal and stops counting. If all error and warning conditions have disappeared by the time the error period counter 525 asserts the COUNT signal, then the interval determination logic 500 preferably decreases the heart rate to the normal rate.

Figure 6:
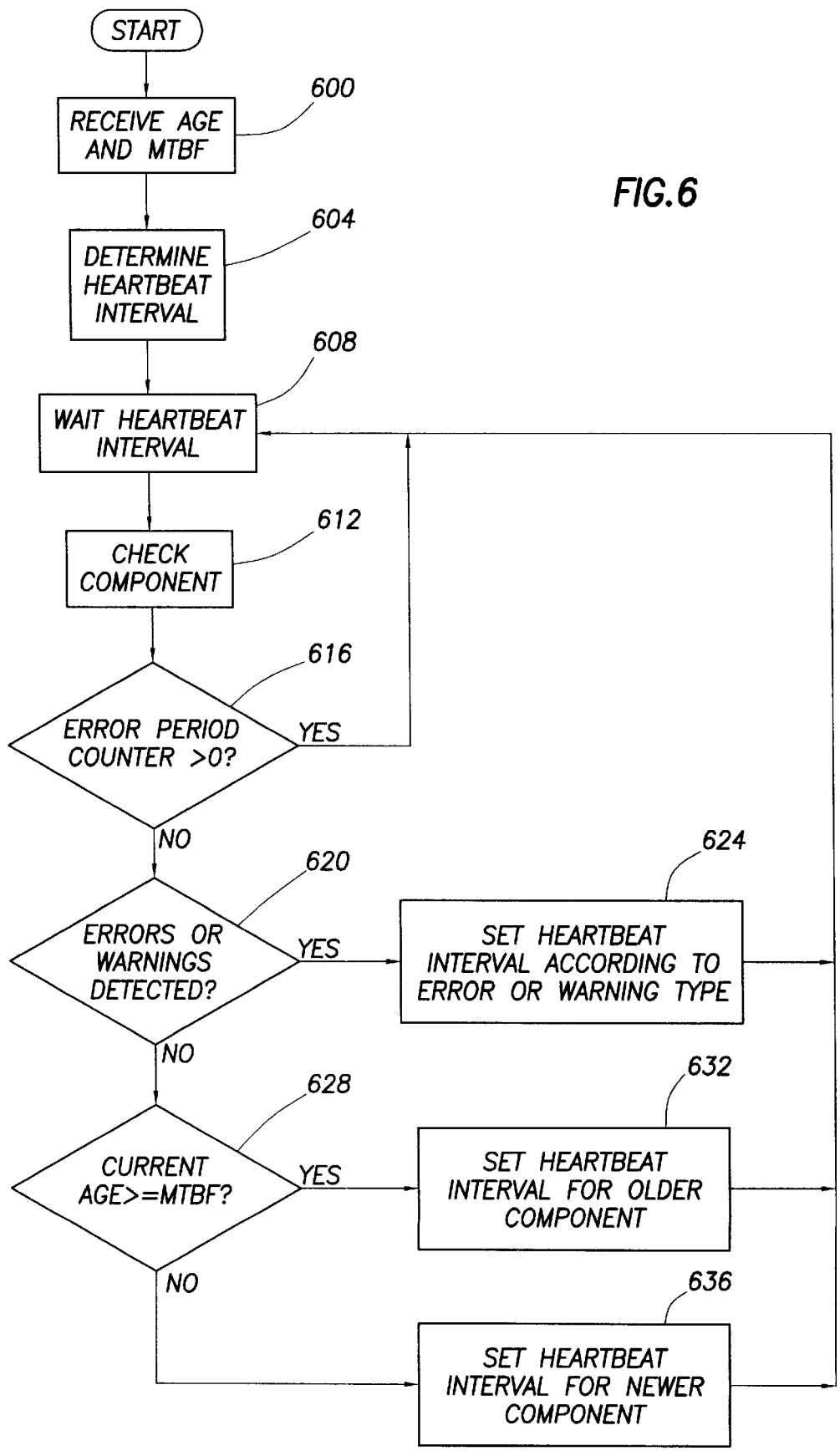
FIG. 6 is a flowchart illustrating the operation of the interval determination logic of FIG. 5.

Referring now to FIGS. 5 and 6, the adaptive interval controller 320 begins operating at step 600, in which the age and MTBF of the heartbeat sender are transmitted from the monitor control logic 310 to the interval determination logic 500 via the CONFIG lines. As described above, the interval determination logic 500 sends the age and MTBF values to the age counter 505 and MTBF register 510, respectively, which determine the value of the COMPARE signal.

Next in step 604, interval determination logic 500 calculates an initial heartbeat period the based on the state of the COMPARE and TEMPWARNING signals. The heartbeat period is then transmitted to the monitor control logic 310 and timing interval counter 530 via the RATE lines. It should be understood that the heartbeat interval (or period) is used to describe the heart rate in a preferred embodiment, although the interval determination logic 500 may equivalently transmit the heart rate (i.e., the frequency of the heartbeat interval) to the monitor control logic 310 in an alternative embodiment.

Beginning in step 608, the timing interval counter 530 counts for one heartbeat interval, beginning from the heartbeat period. When the value of the counter 530 reaches zero, marking the end of the heartbeat period, the timing interval counter 530 asserts the PULSE signal. The timing interval counter 530 then resets to the value of the heartbeat period and begins counting to zero again. If the interval determination logic 500 changed the heartbeat interval during step 608, then the timing interval counter 608 preferably resets to the new heartbeat interval.

Because the PULSE signal in step 608 indicates that a heartbeat period has expired, the heartbeat monitor 130, in step 612, checks the HB register in register file 305 to determine whether a heartbeat was received during step 608. Next in step 616, the interval determination logic 600 checks the error period counter 525 to determine the value of the error period counter 525. If the value of the error period counter 525 is greater than zero, indicating that the adaptive interval controller 320 is within an error period, then the interval determination logic 500 preferably returns to step 608 to await the end of the current heartbeat period. As described previously, the error period represents a period during which the heartbeat frequency is incremented for closer monitoring due to error and warning conditions.

If the value of the error period counter 525 is equal to zero in step 616, indicating that the adaptive interval controller 320 is not within an error period, then the interval determination logic 500 moves to step 620. In step 620, the interval determination logic 500 decides whether or not to enter into an error period based on warning or error conditions such as an over-temperature indication (i.e., the TEMPWARNING signal) or other condition. If an error or warning condition does exist in step 620, then the interval determination logic 500 proceeds to step 624. In step 624, the interval determination logic 500 preferably increases the heart rate (i.e., decreases the heartbeat period) based on the error or warning condition. Accordingly, the new heartbeat period is transmitted to the timing interval counter 530 and monitor control logic 310. Because the heart rate is increased, the heartbeat sender will henceforth begin transmitting heartbeats more frequently, allowing the heartbeat monitor 130 to check more often for failures. If the heartbeat sender does indeed fail during the error period, then the maximum response time for taking corrective actions will be reduced due to the increasing in the heart rate. Following step 624, the preceding steps are repeated, beginning with step 608.

If there is no warning or error condition in step 620, then the interval determination logic 500 determines an appropriate heartbeat interval for the next heartbeat. Accordingly, in step 628 the interval determination logic 500 determines whether the current age of the heartbeat sender is greater than or equal to the MTBF value, as indicated by the state of the COMPARE signal. If the COMPARE signal is asserted, then the interval determination logic 500 in step 632 sets a shorter heartbeat period corresponding to an older component. Otherwise, the interval determination logic 500 in step 636 sets a longer heartbeat period corresponding to a newer component. The interval determination logic 500 then repeats the preceding steps, beginning with step 608.

Figure 7:
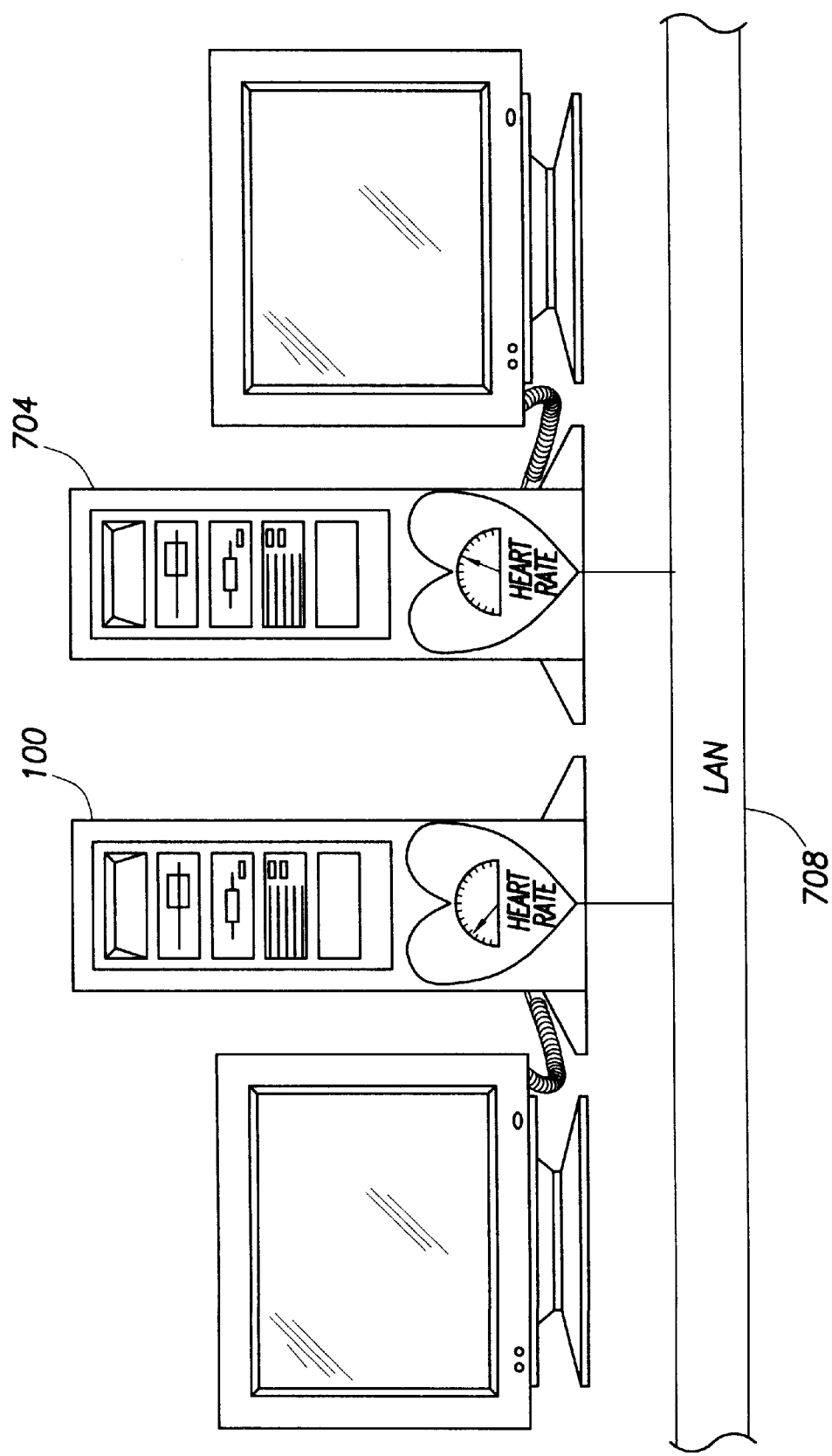
FIG. 7 is a block diagram of a pair of computer systems adapted to exchange adaptive heartbeat messages.

As described previously, the principles of transmitting heartbeats to a heartbeat monitor can be applied to computer systems transmitting heartbeats over a network. Accordingly, FIG. 7 illustrates two computer systems 100 and 704 coupled together via local area network (LAN) 708. Computer system 704 may comprise any type of computer system, including a microcomputer system as in FIG. 1, a network server, a mainframe, or any other type of computer system. LAN 708 preferably operates according to the Ethernet protocol, although any other desired network protocol may be used without departing from the principles of the invention. Further, a metropolitan area network (MAN), wide area network (WAN), or any other network configuration may be used in place of the LAN 708. LAN 708 may also comprise any type of wireless network or other communications channel without departing from the principles of the invention.

In a preferred embodiment of the invention, computer systems 100 and 704 transmit heartbeats to each other over the network 708, i.e. system 100 transmits heartbeats to system 704, and system 704 transmits heartbeats to system 100. As one of ordinary skill in the art would immediately recognize, however, the principles described herein permit numerous different configurations. In one alternative embodiment, only one computer system transmits heartbeats, while the other system receives the heartbeats. In another embodiment, the LAN 708 may couple to numerous computer systems which transmit heartbeats to a single computer system. In yet another embodiment, a dedicated adaptive heartbeat monitor couples to the LAN 708 for monitoring heartbeats from a plurality of computer systems also coupled to LAN 708. Thus, for the sake of simplicity this disclosure will describe the transmitting of heartbeats from system 704 to system 100 only. Transmitting heartbeats from system 100 to system 704 or between any pair of computer systems coupled to network 708 may be implemented in substantially the same manner as in the following description.

Referring now to FIGS. 1 and 7, the heartbeat monitor 130 initially determines a starting heartbeat interval by determining the age and mean time between failure (MTBF) of computer system 704. Accordingly, the heartbeat monitor 130 transmits requests for the age and MTBF values to the NIC 121. The NIC 121 then forwards the requests to computer 704 over the LAN 708. Computer 704 responds to the requests in the same manner, by transmitting the age and MTBF values back to the heartbeat monitor 130 via the NIC 121.

After establishing an initial heartbeat interval for computer 704, the heartbeat monitor 130 asserts the INT4 signal to instruct computer 704 to begin transmitting heartbeats. Accordingly, the NIC 121 forwards a message over the LAN 708 to computer 704 to indicate that the INT4 signal was asserted, and computer 704 begins transmitting heartbeat messages over the LAN 708. Computer system 704 next submits a read request to the heartbeat monitor 130 to determine the value of the initial heartbeat period, which preferably is stored in the INTERVAL4 register of the register file 305. Computer 704 subsequently transmits heartbeats at the specified interval.

As in previous embodiments, the heartbeat monitor 130 is capable of adaptively adjusting the intervals between heartbeats transmitted by computer system 704. To change the heartbeat interval, the heartbeat monitor 130 preferably stores a new interval in the INTERVAL4 register and then asserts the INT4 signal. The NIC 121 then transmits a message to computer 708 indicating that the INT4 signal was asserted. In response, computer system 704 transmits a read request over the LAN 708 to the register file 305 to determine the new interval value, subsequently transmitting heartbeats at the new heart rate.

The heart rate of computer system 704 may change for various reasons, including age, temperature, and other conditions. Because the heartbeat monitor 130 determines the age and MTBF of computer system 704 in the present embodiment, the heart rate preferably changes when the value of the age counter 505 corresponding to computer system 708 exceeds the MTBF value held in the associated MTBF register 510. Also, if the over-temperature TEMP-WARNING signal is asserted, the heartbeat monitor 130 may enter an error period, increasing the heart rate of system 704 until the temperature subsides or the error period expires. Computer system 704 also preferably sends error and warning messages to system 100 over the LAN 708 to notify the heartbeat monitor 130 of possible failure conditions. In one embodiment, computer system 704 transmits warning messages indicating that the internal temperature of computer 704 has exceeded a predetermined threshold. Computer system 100 is thus adapted to adjust the heart rate of computer 704 based on a direct reading of the internal temperature of computer 704 and need not rely on the temperature sensor 315 inside computer system 100, which may provide a temperature that is different from the true internal temperature of computer 704. Computer 704 also may transmit additional warning and error messages that affect the heart rate, as will become apparent upon reading this disclosure.

The embodiment of FIG. 7 represents one example of a peer-to-peer relationship, or a configuration in which two similar devices, or "peers," are adapted to intercommunicate or transfer data or control signals from one peer to another. In addition, networks of peer-to-peer devices, such as intelligent input/output (IIO) devices, often are incorporated into computer systems to facilitate transferring data in and out of the computer system. Many of these devices function according to I$_2$O® protocols developed by Intel Corporation, in which the IIO devices intercommunicate directly with each other and thereby eliminate the need for the CPU to handle such transactions. Because peer-to-peer devices are adapted to intercommunicate, any set of peer-to-peer devices may receive heartbeats from one or more other peers in an alternative embodiment. Hence, the present invention need not be limited to peer-to-peer heartbeat transactions between computer systems but may be incorporated into any peer-to-peer configuration such as IIO devices or between any other desired devices.

Figure 8:
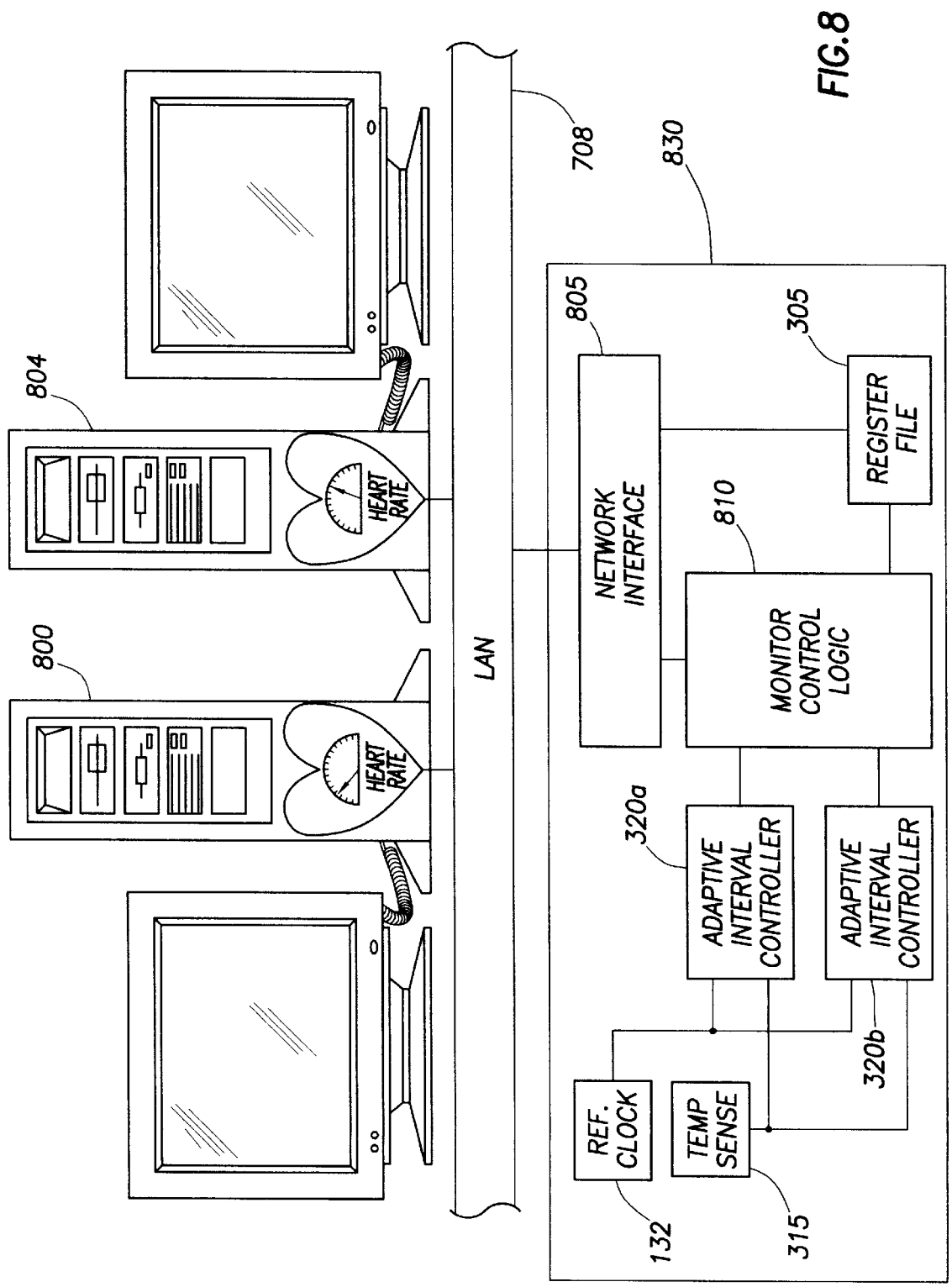
FIG. 8 is a block diagram of a pair of computer systems coupled to a dedicated adaptive heartbeat monitor via local area network.

FIG. 8 illustrates yet another embodiment of the present invention, including computer systems 800 and 804 coupled to network heartbeat monitor 830 via LAN 708. Computer systems 800 and 804 may be any suitable computer systems including standard microcomputers such as the computer system 100 of FIG. 1, network servers, mainframes, peer-to-peer devices, or any other types of systems.

The network heartbeat monitor 830 operates in substantially the same manner as the heartbeat monitor 130 of FIG. 1, although the network heartbeat monitor 830 is configured as a dedicated unit coupled directly to the LAN 708 for receiving heartbeat messages. Accordingly, network heartbeat monitor comprises a monitor control logic 810 coupled to a network interface 805, a register file 305, and one or more adaptive interval controllers 320. Although only two adaptive interval controllers 320a–b are shown in FIG. 8 (associated with heartbeats from computers 800 and 804), network heartbeat monitor 830 preferably includes an adaptive interval controller 320 for each computer system transmitting a heartbeat over the LAN 708. Adaptive interval controllers 320a–b further couple to a reference clock 132 and a temperature sensor 315, as in previous embodiments. The network interface 805 couples to the LAN 708 for conducting network transactions associated between the network heartbeat monitor 830 and the LAN 708.

In the embodiment of FIG. 8, the monitor control logic 810 determines the manufacturing dates and MTBFs of computers 800 and 804, storing these values into the register file 305. The MTBFs and manufacturing dates preferably are determined by submitting read requests to the appropriate computer systems via the LAN 708. Alternatively, the MTBFs and manufacturing dates may be programmed directly into the register file 305 from an external source or may be sent directly by one of the computer systems 800 or 804, either automatically or in response to a user request. Monitor control logic 810 then transmits the MTBFs and manufacturing dates to the associated adaptive interval controllers 320a–b, which respond by sending the appropriate heartbeat periods to monitor control logic 810 as in previous embodiments. The monitor control logic 810 next stores the heartbeat periods into the register file 305 and notifies computer systems 800 and 804 via the LAN 708 to begin transmitting heartbeats. Computers 800 and 804 transmit heartbeats as in previous embodiments, by sending heartbeat messages to the network heartbeat monitor 830 over the LAN 708. If an adaptive interval controller 320 changes the heartbeat period for a computer system, the monitor control logic 810 preferably notifies that computer system of the interval change via the LAN 708. To determine initial heartbeat intervals and to respond to messages from the network heartbeat monitor 830 that the heart rates have changed, computer systems 800 and 804 preferably submit read requests via LAN 708 to the appropriate registers in register file 305. Thus, the heartbeat monitor 830 may comprise a dedicated unit coupled to the network 708 and need not be included within another computer system, as in previous embodiments.

As one of ordinary skill in the art would no doubt recognize, there are numerous other alternatives and modifications to the embodiments presented in this disclosure for providing an adaptive heartbeat monitoring scheme for one or more computer systems and/or computer components. In particular, the heartbeat monitor need not only increase the heartbeat when a heartbeat sender surpasses the MTBF but can modify heartbeat periods at any number of different ages. For example, the heartbeat may be raised each time a heartbeat sender reaches one of the ages ½*MTBF, MTBF, ³⁄₂*MTBF, 2*MTBF, or any other age. It should be understood that any desired set of ages or times may trigger changes in the heart rate, however.

Also, a heartbeat scheme may be incorporated in which each heartbeat sender transmits heartbeats at one of two predetermined heart rates. In such a scheme, the heartbeat monitor chooses one of the two heart rates based on age, temperature, error/warning conditions, and any other desired criteria. Because only two rates are used, the heartbeat monitor may assert an interrupt or other sideband signal to indicate that the heart rate toggles between the lower rate and the higher rate. The resulting device thus requires no bus or network capacity to configure and change the heartbeat intervals. For instance, a component that is newer than its MTBF and which is operating error free and below the over-temperature threshold uses the lower heart rate under this scheme. Conversely, a component that is older than its MTBF or which is experiencing operating errors or which is above the over-temperature threshold uses the higher heart rate under this scheme. To toggle the heart rate from the lower rate to the higher rate or from the higher rate to the lower rate, the heartbeat monitor simply asserts and then deasserts (or "pulses") the interrupt or sideband signal. The heartbeat sender then changes from the lower rate to the higher rate or from the higher rate to the lower rate as appropriate.

In another embodiment, heart rates are chosen from a predetermined, ordered list of possible heart rates. To select one of the possible heart rates, the heartbeat monitor asserts an interrupt or sideband signal indicating that the heart rate has changed. In response, the heartbeat monitor and heartbeat sender begin receiving/transmitting heartbeats according to the heartbeat interval which is next in order on the list. Alternatively, the heartbeat monitor transmits a message to the heartbeat sender containing an index that identifies the new heart rate from the ordered list.

Other modifications and alternatives are possible, as well. For instance, in one embodiment each heartbeat sender determines and transmits its own heartbeat interval to the heartbeat monitor. The adaptive interval controllers then generate pulses to check the heartbeats according to the intervals specified by the heartbeat senders. In another embodiment, heartbeat senders transmit heartbeats to the heartbeat monitor via direct signals such as sideband signals or interrupts. Warning and error signals may also be transmitted to the heartbeat monitor via direct sideband or interrupt signals. In yet another embodiment, a heartbeat sender need not explicitly know the heartbeat interval. Instead, the heartbeat monitor periodically pulses an interrupt signal to indicate that the heartbeat sender should transmit a heartbeat. Accordingly, the heartbeat senders transmit heartbeat messages only in response to the interrupt signals. In such an embodiment, the heart rate is varied by adjusting the rate at which the interrupt signals are asserted. In one other embodiment, some heartbeat senders transmit heartbeats at constant intervals while the heart rates of other devices are adaptively controlled by the heartbeat monitor.

In yet another aspect of the present invention, a software interface allows a computer user to adjust the sensitivity of the heartbeat monitor based on the applications that the computer system is running. Such an interface may be developed as a software driver, control panel utility, or other software program that interacts with the computer operating system to allow the user to configure the heartbeat monitor. For instance, if the user determines that a high level of fault tolerance is necessary, then the user may configure the heartbeat monitor to raise heart rates for one or more heartbeat senders. If the user desires a low level of fault tolerance, then the user may configure the heartbeat monitor to lower the heart rates for one or more devices. The software interface may provide many other flexible options to the user as well, including allowing the user to select which devices should transmit heartbeats and to enter manufacturing dates and MTBFs for the heartbeat senders.

In addition, a software program running on a processor or other programmable device may be used to implement part or all of the heartbeat monitor. For instance, a software driver, a network management software package, or even a computer operating system or shell may incorporate the functions of the heartbeat monitor as described in this disclosure.

Numerous other variations and modifications will become apparent to those skilled in the art once the above disclosure is fully appreciated. It is intended that the following claims be interpreted to embrace all such variations and modifications.

We claim:

1. A computer system, comprising:
   a processor for executing program instructions and processing data, said processor transmitting a periodic heartbeat;
   a heartbeat monitor coupled to said processor and capable of receiving heartbeats; and
      wherein said heartbeat monitor adaptively adjusts the time interval between heartbeats.

2. A computer system, comprising:
   a processor for executing program instructions and processing data, said processor transmitting a periodic heartbeat;
   a heartbeat monitor coupled to said processor and capable of receiving heartbeats; and
   wherein said heartbeat monitor adaptively adjusts the time interval between heartbeats; wherein said heartbeat monitor comprises:
      a register file capable of storing the interval between heartbeats and which stores the heartbeat from said processor;
      an interval controller coupled to said register file and capable of adaptively adjusting the interval between heartbeats; and
      a control logic coupled to said interval controller and said register file, said control logic capable of asserting an interrupt signal to said processor to indicate a charge in the heartbeat interval.

3. A computer system as in claim 2, wherein said register file includes an MFG register for storing the manufacturing date of said processor, wherein said control logic determines the age of said processor based on the contents of said MFG register, and wherein said interval controller adjusts the interval between heartbeats based on the age of said processor.

4. A computer system as in claim 3, wherein said register file includes an MTBF register for holding the mean time between failure of said processor, and wherein said interval controller decreases the interval between heartbeats when the age of said processor exceeds the value of said MTBF register.

5. A computer system as in claim 2, wherein said register file includes an MSG register capable of storing warning and error messages from said processor, and wherein said interval controller adjusts the interval between heartbeats based on the contents of said MSG register.

6. A computer system as in claim 2, wherein said heartbeat monitor further includes a temperature sensor which assents an over-temperature signal to said interval controller, and wherein said interval controller is capable of adjusting the interval between heartbeats if the over-temperature signal is asserted.

7. A computer system as in claim 6 wherein said interval controller changes the interval between heartbeats if the over-temperature signal is asserted.

8. A computer system as in claim 2 wherein said interval controller comprises:
   an age counter which determines the age of said processor;
   an interval determination logic coupled to said age counter and which adjusts the interval between heartbeats based on the age of said processor, said interval determination logic transmitting RATE signals to said control logic that define the heartbeat interval; and
   an interval counter coupled to said interval determination logic, wherein said interval counter asserts a periodic PULSE signal having a period corresponding to the interval between heartbeats.

9. A computer system as in claim 8, wherein said interval controller further comprises a comparator coupled to said age counter and said interval determination logic, said comparator asserting a COMPARE signal if the value of the age counter exceeds a predetermined age.

10. A computer system as in claim 9, wherein said interval controller further includes an MTBF register coupled to said comparator and which holds the mean time between failure of said processor, and wherein said predetermined age is defined by the contents of said MTBF register.

11. A computer system as in claim 8, wherein:
   said interval determination logic is capable of receiving a warning message to indicate a warning or error condition pertaining to said processor; and
   said interval controller includes an error period counter coupled to said interval determination logic, said interval determination logic capable of programming said error period counter to count for a predetermined period of time if a warning message is received.

12. A computer system as in claim 11, wherein said interval determination logic adjusts the interval between heartbeats based on the value of said error period counter.

13. A computer system as in claim 12, wherein said heartbeat monitor includes a temperature sensor which transmits a warning message to said interval determination logic if said temperature sensor measures a temperature exceeding a predetermined threshold.

14. A computer system as in claim 1 further comprising a bridge logic unit coupled to said processor and to said heartbeat monitor and a memory device coupled to said bridge logic unit, wherein said bridge logic device transmits a periodic heartbeat to said heartbeat monitor as a proxy for said memory device.

15. A computer system as in claim 14 wherein said heartbeat monitor adaptively adjusts the interval between heartbeats transmitted by said bridge logic unit.

16. A computer system as in claim 1 further including a plurality of processors coupled to said bridge logic device, wherein each of said plurality of processors transmits a periodic heartbeat to said heartbeat monitor.

17. A computer system as in claim 16 wherein said heartbeat monitor adaptively adjusts the interval between heartbeats transmitted by each of said processors.

18. A computer system as in claim 1 further including a network interface card coupled to said heartbeat monitor and capable of being coupled to a computer network, said network interface card further capable of transmitting a heartbeat to said heartbeat monitor in response to a computer network message if said network interface card is coupled to a computer network.

19. A computer system, comprising:
   a processor capable of executing program instructions and processing data, said processor further capable of transmitting processor heartbeat messages;
   a memory device coupled to said processor and capable of storing and retrieving data;
   a bridge logic device disposed between said processor and said memory device, said bridge logic device further capable of transmitting memory heartbeat messages indicating that said memory device is functional;
   a network interface card coupled to said bridge logic device and capable of transmitting a network heartbeat message;
   a heartbeat monitor coupled to said bridge logic device, comprising:
      a register adapted to receives heartbeat messages from said processor, said bridge logic device, and said network interface card;
      a plurality of interval controllers which provide PULSE signals that indicate the time intervals between heartbeat messages, said interval controllers capable of adaptively adjusting the intervals between heartbeats; and a control logic device coupled to said register and to said interval controllers and which checks said register for heartbeat messages in response to a pulse signal; and an input device operatively coupled to said processor.

20. A computer system as in claim 19 wherein said heartbeat monitor includes a temperature sensor coupled to said control logic device and wherein the intervals between heartbeats transmitted by said processor, said bridge logic device, and said network interface card are changed if said temperature sensor detects a temperature that is greater than a predetermined threshold.

21. A computer system as in claim 19 wherein said heartbeat monitor is further adapted to receive warning messages from said processor, said bridge logic device, and said network interface card, wherein said heartbeat monitor adjusts the intervals between heartbeats based on the warning messages.

22. A computer system as in claim 21 wherein if said heartbeat monitor changes a heartbeat interval from a first interval to a second interval in response to a warning message, then the heartbeat interval reverts to the first interval after a predetermined error period.

23. A computer system as in claim 19 including a first interval controller, said first interval controller comprising:
an interval determination logic coupled to said control logic device;
an age counter coupled to said interval determination logic which is adapted to represent the age of a component in said computer system;
a time register coupled to said interval determination logic; and
a comparator coupled to said age counter, said age register, and said interval determination logic, said comparator asserting a COMPARE signal if the value of said age counter exceeds the value stored in said age register, wherein said interval determination logic adjusts a heartbeat interval based on the COMPARE signal.

24. A computer system as in claim 19 including a first interval controller, said first interval controller comprising:
an interval determination logic coupled to said control logic device and capable of receiving warning messages;
an error period counter coupled to said interval determination logic, wherein said error period counter begins counting for a predetermined error period if said interval determination logic receives a warning message; and
wherein said interval determination logic changes a heartbeat interval during said error period.

25. A computer system as in claim 24 wherein the warning messages include an over-temperature signal.

26. A computer system, comprising:
a monitor logic unit capable of receiving status signals from a component indicating the operative status of said component at periodic intervals, said monitor logic unit further capable of adaptively adjusting the intervals of said status signals;
a first component coupled to said monitor logic unit and which periodically transmits status signals to said monitor logic unit according to the interval specified by said monitor logic unit; and
wherein said monitor logic unit detects if said first component fails to transmit a status signal within the interval.

27. A computer system as in claim 26 wherein said first component comprises a processor.

28. A computer system as in claim 26, further including a memory device for storing and retrieving data, and wherein said first component comprises a bridge logic unit coupled to said memory device and transmitting status signals on behalf of said memory device.

29. A computer system as in claim 28 wherein said first component comprises a network interface card capable of transmitting status signals in response to computer network messages.

30. A network, comprising:
a network channel;
a first computer coupled to said network channel and which transmits heartbeats at programmable intervals over said network channel;
a second computer coupled to said network channel, said second computer receiving heartbeats from said first computer; and
wherein said second computer is capable of dynamically programming the intervals between heartbeats transmitted by said first computer during network operation.

31. A network, comprising:
a network channel;
a first computer coupled to said network channel and which transmits heartbeats at programmable intervals over said network channel;
a second computer coupled to said network channel, said second computer receiving heartbeats from said first computer; and
wherein said second computer is capable of programming the intervals between heartbeats transmitted by said first computer;
wherein said first computer transmits warning messages to said second computer and wherein said second computer adaptively changes the interval between heartbeats based on the warning messages.

32. A network as in claim 31 wherein said second computer changes the interval between heartbeats for a predetermined error period in response to a warning message.

33. A network as in claim 31 wherein said second computer adjusts the interval between heartbeats based on the age of said first computer.

34. A network as in claim 33 wherein said second computer decreases the interval between heartbeats when the age of said first computer exceeds the mean time between failure of said first computer.

35. A network as in claim 31, wherein said second computer comprises:
a network interface card coupled to said network channel and receiving heartbeats from said first computer; and
a heartbeat monitor coupled to said network interface card and capable of receiving heartbeats from said first computer via said network interface card.

36. A heartbeat monitor capable of receiving heartbeat messages from a heartbeat sender and adaptively adjusting the intervals between the heartbeat messages, comprising:
a bus interface for receiving heartbeat messages;
a register file coupled to said bus interface and capable of storing heartbeat messages and warnings from said heartbeat sender; and
an interval controller which adaptively determines the intervals between the heartbeat messages.

37. A heartbeat monitor as in claim 36 including a temperature sensor which asserts a WARNING signal in response to a temperature that exceeds a predetermined temperature threshold.

38. A heartbeat monitor as in claim 36, further comprising a control logic coupled to said register file and said interval controller, said control logic capable of detecting if said heartbeat sender fails to transmit a heartbeat to said heartbeat monitor and further capable of receiving warning messages from said heartbeat sender.

39. A heartbeat monitor as in claim 38 wherein said interval controller changes the heartbeat interval in response to a warning message.

40. A heartbeat monitor as in claim 38 wherein if said heartbeat monitor receives a warning message, then said interval controller changes the heartbeat interval for a specified error period.

41. A heartbeat monitor as in claim 38, wherein said interval controller comprises:
an age counter that determines the age of said heartbeat sender;
an interval determination logic coupled to said age counter and which adjusts the heartbeat interval based on the value of said age counter and transmits the adjusted heartbeat interval to said control logic; and
timing counter which receives the adjusted heartbeat from said interval determination logic, said timing counter providing periodic pulses to said control logic to mark the heartbeat intervals.

42. A heartbeat monitor as in claim 41, further including:
an age register coupled to said interval determination logic;
a comparator coupled to said age counter and said age register, said comparator asserting a COMPARE signal to said interval determination logic if the value of said age counter exceeds a value held in said age register; and
wherein said interval determination logic changes the heartbeat interval after the COMPARE signal is asserted.

43. A heartbeat monitor as in claim 41 wherein said age register holds the mean time between failure of said heartbeat sender.

44. A heartbeat monitor as in claim 38, wherein said interval controller comprises:
an interval determination logic coupled to said control logic and which receives warning messages from said control logic;
an error period counter coupled to said interval determination logic and which counts for a predetermined error period if said interval determination logic receives a warning message; and
wherein said interval determination logic changes the heartbeat interval depending on whether said error period counter is counting an error period.

45. A method for providing fault tolerance in a computer network, comprising:
(a) setting a heartbeat interval;
(b) transmitting a first heartbeat from a heartbeat sender to a heartbeat monitor; and
(c) dynamically updating a heartbeat interval.

46. A method as in claim 45 wherein step (c) comprises decreasing the heartbeat interval if the age of said heartbeat sender exceeds a predetermined age limit.

47. A method for providing fault tolerance in a computer network, comprising:

(a) setting a heartbeat interval;
(b) transmitting a first heartbeat from a heartbeat sender to a heartbeat monitor; and
(c) updating a heartbeat interval;
(d) transmitting a second heartbeat from said heartbeat sender to said heartbeat monitor one heartbeat interval after transmitting the first heartbeat
wherein step (c) comprises:
(c1) transmitting a warning signal to said heartbeat monitor that indicates an error or warning condition pertaining to said heartbeat sender; and
(c2) updating the heartbeat interval based on the warning signal.

48. A method as in claim 47 including decreasing the heartbeat interval.

49. A method as in claim 47 including increasing the heartbeat interval.

50. A method as in claim 47 wherein said warning signal identifies a temperature corresponding to said heartbeat sender.

51. A method for providing fault tolerance in a computer network, comprising:
(a) setting a heartbeat interval;
(b) transmitting a first heartbeat from a heartbeat sender to a heartbeat monitor; and
(c) updating a heartbeat interval;
(d) transmitting a second heartbeat from said heartbeat sender to said heartbeat monitor one heartbeat interval after transmitting the first heartbeat;
(e) storing the manufacturing date of said heartbeat sender into said heartbeat monitor;
(f) determining the age of said heartbeat sender based on the value in step (d);
(g) selecting a long heartbeat interval in step (a) if said age is greater than or equal to a predetermined value; and
(h) selecting a short heartbeat interval in step (a) if said age is less than said predetermined value.

52. A method as in claim 47, wherein step (c) further comprises:
(c3) counting for a predetermined error period after changing the heartbeat interval; and
(c4) updating the heartbeat interval after the error period expires.

53. A method for providing fault tolerance in a computer network, comprising:
(a) setting a heartbeat interval;
(b) transmitting a first heartbeat from a heartbeat sender to a heartbeat monitor;
(c) updating a heartbeat interval; and
(d) transmitting a second heartbeat from said heartbeat sender to said heartbeat monitor one heartbeat interval after transmitting the first heartbeat;
wherein step (c) includes decreasing the heartbeat interval after a first predetermined time.

54. A method as in claim 53 wherein step (c) further includes progressively decreasing the heartbeat interval after each of a plurality of predetermined times.

55. A method for providing fault tolerance in a computer network, comprising:
(a) transmitting a first heartbeat from a heartbeat sender to a heartbeat monitor;
(b) transmitting a second heartbeat from said heartbeat sender to said heartbeat monitor at a predetermined time interval after transmitting the first heartbeat; and
(c) adaptively determining a new time interval.

56. A peer-to-peer system comprising:

a first peer device capable of transmitting heartbeats;

a second peer device coupled to said first peer and capable of receiving heartbeats from said first peer;

wherein said second peer device adaptively adjusts the intervals between heartbeats transmitted by said first peer device.

57. A peer-to-peer system as in claim 56, wherein said second peer device includes an interval controller capable of determining the age of said first peer device and adaptively adjusting the heartbeat intervals according to said age.

58. A peer-to-peer system comprising:

a first peer device capable of transmitting heartbeats;

a second peer device coupled to said first peer and capable of receiving heartbeats from said first peer;

wherein said second peer device adaptively adjusts the intervals between heartbeats transmitted by said first peer device; and wherein said second peer device includes an interval controller and a temperature sensor coupled to said interval controller, said interval controller capable of adjusting the heartbeat intervals based on the temperature measured by said temperature sensor.

59. An adaptive heartbeat interval controller for dynamically adjusting a heartbeat interval of a computer device, comprising:

an interval determination logic that specifies the heartbeat interval;

an age counter coupled to said an interval determination logic and capable of determining the age of said computer device;

a time register coupled to said an interval determination logic and capable of holding a time value; and a comparator coupled to said age counter, said time register, and said interval determination logic, said comparator asserting a COMPARE signal if the age from said age counter exceeds the time value from said time register, wherein said interval determination logic decreases the heartbeat interval if the COMPARE signal is asserted.

60. An adaptive heartbeat interval controller for dynamically adjusting a heartbeat interval of a computer device, comprising:

an interval determination logic that specifies the heartbeat interval and receives warning signals pertaining to said computer device;

an error period counter coupled to said interval determination logic and which counts for a predetermined error period if said interval determination logic receives a warning signal; and wherein said interval determination logic adjusts the heartbeat interval according to the value of said error period counter.

61. An adaptive heartbeat interval controller as in claim 60 wherein said interval determination logic specifies a first heartbeat interval if the value of said error period counter is greater than zero and specifies a second heartbeat interval if the value of said error period counter is zero, wherein said first heartbeat interval is less than said second heartbeat interval.

* * * * *